(12) United States Patent
Alkhatib et al.

(10) Patent No.: US 7,949,785 B2
(45) Date of Patent: May 24, 2011

(54) SECURE VIRTUAL COMMUNITY NETWORK SYSTEM

(75) Inventors: Hasan S. Alkhatib, Saratoga, CA (US); Fouad A. Tobagi, Los Altos, CA (US); Farid F. Elwailly, San Jose, CA (US)

(73) Assignee: Inpro Network Facility, LLC, Wilmington, DE (US)

( * ) Notice: Subject to any disclaimer, the term of this patent is extended or adjusted under 35 U.S.C. 154(b) by 685 days.

(21) Appl. No.: 10/403,818

(22) Filed: Mar. 31, 2003

(65) Prior Publication Data

US 2004/0249911 A1 Dec. 9, 2004

(51) Int. Cl.
*G06F 15/16* (2006.01)
(52) U.S. Cl. .......................... 709/245; 726/15
(58) Field of Classification Search ................. 709/245; 726/15
See application file for complete search history.

(56) References Cited

U.S. PATENT DOCUMENTS

| | | |
|---|---|---|
| 5,159,592 A | 10/1992 | Perkins |
| 5,361,256 A | 11/1994 | Doeringer |
| 5,563,878 A | 10/1996 | Blakeley |
| 5,623,605 A | 4/1997 | Keshav |
| 5,701,427 A | 12/1997 | Lathrop |
| 5,717,686 A | 2/1998 | Schiavoni |
| 5,717,687 A | 2/1998 | Minot |
| 5,734,651 A | 3/1998 | Blakeley |
| 5,751,961 A | 5/1998 | Smyk |
| 5,754,938 A * | 5/1998 | Herz et al. ............ 725/116 |
| 5,764,906 A | 6/1998 | Edelstein |
| 5,777,989 A | 7/1998 | McGarvey |
| 5,781,550 A | 7/1998 | Templin |
| 5,790,548 A | 8/1998 | Sistanizadeh |
| 5,793,763 A | 8/1998 | Mayes |
| 5,805,818 A | 9/1998 | Perlman |
| 5,805,820 A | 9/1998 | Bellovin |
| 5,815,664 A | 9/1998 | Asano |
| 5,826,014 A | 10/1998 | Coley |
| 5,856,974 A | 1/1999 | Gervais |
| 5,864,666 A | 1/1999 | Shrader |
| 5,867,667 A | 2/1999 | Butman |
| 5,884,038 A | 3/1999 | Kapoor |

(Continued)

FOREIGN PATENT DOCUMENTS

EP 0 817 444 A2 1/1998

OTHER PUBLICATIONS

Venters, Demystifying Protocols: A comparison of Protocols Suitable for IP Telephony, Sonus Networks, pp. 1-11, 2000.

(Continued)

*Primary Examiner* — Douglas B Blair
(74) *Attorney, Agent, or Firm* — McAndrews, Held & Malloy, Ltd.

(57) ABSTRACT

A private virtual dynamic network is provided for computing devices coupled to public networks or private networks. This enables computing devices anywhere in the world to join into private enterprise intranets and communicate with each other. In one embodiment, the present invention provides a separate private virtual address realm, seen to each user as a private network, while seamlessly crossing public and private network boundaries. One implementation of the present invention uses an agent to enable an entity to participate in the network without requiring the member to add new hardware or software.

90 Claims, 21 Drawing Sheets

U.S. PATENT DOCUMENTS

| | | | |
|---|---|---|---|
| 5,884,246 | A | 3/1999 | Boucher |
| 5,889,953 | A | 3/1999 | Thebaut |
| 5,897,662 | A | 4/1999 | Corrigan |
| 5,898,830 | A | 4/1999 | Wesinger, Jr. |
| 5,913,210 | A | 6/1999 | Call |
| 5,937,162 | A | 8/1999 | Funk |
| 5,937,163 | A | 8/1999 | Lee |
| 6,003,084 | A | 12/1999 | Green |
| 6,006,272 | A | 12/1999 | Aravamudan |
| 6,032,196 | A | 2/2000 | Monier |
| 6,047,325 | A | 4/2000 | Jain |
| 6,055,236 | A | 4/2000 | Nessett |
| 6,055,575 | A | 4/2000 | Paulsen |
| 6,058,431 | A | 5/2000 | Srisuresh |
| 6,061,349 | A | 5/2000 | Coile |
| 6,061,738 | A | 5/2000 | Osaku |
| 6,101,543 | A | 8/2000 | Alden |
| 6,119,171 | A | 9/2000 | Alkhatib |
| 6,122,276 | A | 9/2000 | Boe |
| 6,128,664 | A | 10/2000 | Yanagidate |
| 6,137,791 | A | 10/2000 | Frid |
| 6,154,777 | A | 11/2000 | Ebrahim |
| 6,154,839 | A | 11/2000 | Arrow |
| 6,173,399 | B1 | 1/2001 | Gilbrech |
| 6,219,715 | B1 | 4/2001 | Ohno |
| 6,226,751 | B1 * | 5/2001 | Arrow et al. ............ 726/15 |
| 6,243,749 | B1 | 6/2001 | Sitaraman |
| 6,249,801 | B1 | 6/2001 | Zisapel |
| 6,266,707 | B1 | 7/2001 | Boden et al. |
| 6,304,906 | B1 | 10/2001 | Bhatti |
| 6,353,614 | B1 | 3/2002 | Borella |
| 6,353,886 | B1 | 3/2002 | Howard |
| 6,381,638 | B1 | 4/2002 | Mahler |
| 6,421,732 | B1 | 7/2002 | Alkhatib |
| 6,430,622 | B1 | 8/2002 | Aiken, Jr. |
| 6,430,623 | B1 | 8/2002 | Alkhatib |
| 6,438,597 | B1 | 8/2002 | Mosberger |
| 6,438,612 | B1 | 8/2002 | Ylonen |
| 6,452,925 | B1 | 9/2002 | Sistanizadeh |
| 6,457,061 | B1 | 9/2002 | Bal |
| 6,477,565 | B1 | 11/2002 | Daswani et al. |
| 6,480,508 | B1 | 11/2002 | Mwikalo |
| 6,490,289 | B1 | 12/2002 | Zhang et al. |
| 6,496,867 | B1 | 12/2002 | Beser |
| 6,507,873 | B1 | 1/2003 | Suzuki |
| 6,510,154 | B1 | 1/2003 | Mayers |
| 6,523,068 | B1 | 2/2003 | Beser |
| 6,556,584 | B1 | 4/2003 | Horsley |
| 6,557,037 | B1 | 4/2003 | Provino |
| 6,557,306 | B1 | 5/2003 | Sekiya |
| 6,591,306 | B1 | 7/2003 | Redlich |
| 6,594,704 | B1 * | 7/2003 | Birenback et al. ............ 709/238 |
| 6,618,757 | B1 | 9/2003 | Babbitt |
| 6,629,137 | B1 | 9/2003 | Wynn |
| 6,631,416 | B2 * | 10/2003 | Bendinelli et al. ............ 709/227 |
| 6,651,101 | B1 | 11/2003 | Gai |
| 6,657,991 | B1 | 12/2003 | Akgun |
| 6,662,223 | B1 | 12/2003 | Zhang |
| 6,697,377 | B1 | 2/2004 | Ju |
| 6,701,437 | B1 * | 3/2004 | Hoke et al. ............ 726/15 |
| 6,708,219 | B1 | 3/2004 | Borella et al. |
| 6,722,210 | B2 | 4/2004 | Armstrong |
| 6,731,642 | B1 | 5/2004 | Borella |
| 6,742,045 | B1 | 5/2004 | Jordan |
| 6,747,979 | B1 | 6/2004 | Banks |
| 6,754,706 | B1 | 6/2004 | Swildens |
| 6,772,210 | B1 | 8/2004 | Edholm |
| 6,778,528 | B1 | 8/2004 | Blair |
| 6,779,035 | B1 | 8/2004 | Gbadegesin |
| 6,781,982 | B1 | 8/2004 | Borella |
| 6,832,322 | B1 * | 12/2004 | Boden et al. ............ 726/15 |
| 6,948,003 | B1 | 9/2005 | Newman |
| 6,961,783 | B1 * | 11/2005 | Cook et al. ............ 709/245 |
| 6,970,941 | B1 * | 11/2005 | Caronni et al. ............ 709/238 |
| 6,973,485 | B2 | 12/2005 | Ebata |
| 6,981,020 | B2 | 12/2005 | Miloslavsky |
| 6,982,953 | B1 | 1/2006 | Swales |
| 6,983,319 | B1 | 1/2006 | Lu |
| 6,993,012 | B2 | 1/2006 | Liu |
| 6,993,595 | B1 | 1/2006 | Luptowski |
| 6,996,628 | B2 | 2/2006 | Keane |
| 6,996,631 | B1 | 2/2006 | Aiken |
| 7,003,481 | B2 | 2/2006 | Banka |
| 7,010,702 | B1 * | 3/2006 | Bots et al. ............ 726/13 |
| 7,028,333 | B2 | 4/2006 | Tuomenoksa et al. |
| 7,028,334 | B2 | 4/2006 | Tuomenoksa et al. |
| 7,032,242 | B1 | 4/2006 | Grabelsky |
| 7,054,322 | B2 | 5/2006 | D'Annunzio |
| 7,058,052 | B2 | 6/2006 | Westphal |
| 7,068,655 | B2 | 6/2006 | March et al. |
| 7,072,337 | B1 | 7/2006 | Arutyunov et al. |
| 7,072,935 | B2 | 7/2006 | Kehoe et al. |
| 7,085,854 | B2 | 8/2006 | Keane et al. |
| 7,092,390 | B2 * | 8/2006 | Wan ............ 370/392 |
| 7,107,464 | B2 * | 9/2006 | Shapira et al. ............ 709/200 |
| 7,107,614 | B1 * | 9/2006 | Boden et al. ............ 726/15 |
| 7,110,375 | B2 | 9/2006 | Khalil et al. |
| 7,120,676 | B2 | 10/2006 | Nelson et al. |
| 7,133,368 | B2 | 11/2006 | Zhang et al. |
| 7,139,828 | B2 | 11/2006 | Alkhatib |
| 7,181,542 | B2 * | 2/2007 | Tuomenoksa et al. ......... 709/250 |
| 7,194,553 | B2 * | 3/2007 | Lucco et al. ............ 709/245 |
| 7,227,864 | B2 | 6/2007 | Collins et al. |
| 7,263,719 | B2 * | 8/2007 | Jemes et al. ............ 726/12 |
| 7,327,721 | B2 * | 2/2008 | Balasaygun et al. ......... 370/352 |
| 7,424,737 | B2 * | 9/2008 | Wesinger et al. ............ 726/11 |
| 7,490,151 | B2 * | 2/2009 | Munger et al. ............ 709/225 |
| 7,653,747 | B2 * | 1/2010 | Lucco et al. ............ 709/245 |
| 7,787,428 | B2 * | 8/2010 | Furukawa et al. ............ 370/338 |
| 7,814,228 | B2 * | 10/2010 | Caronni et al. ............ 709/245 |
| 7,827,304 | B2 * | 11/2010 | Park et al. ............ 709/238 |
| 7,844,718 | B2 * | 11/2010 | Polcha et al. ............ 709/229 |
| 7,853,714 | B1 * | 12/2010 | Moberg et al. ............ 709/238 |
| 2001/0027474 | A1 | 10/2001 | Nachman et al. |
| 2001/0050914 | A1 * | 12/2001 | Akahane et al. ............ 370/382 |
| 2002/0013848 | A1 * | 1/2002 | Rene Salle ............ 709/226 |
| 2002/0026525 | A1 | 2/2002 | Armitage |
| 2002/0053031 | A1 * | 5/2002 | Bendinelli et al. ............ 713/201 |
| 2002/0056008 | A1 * | 5/2002 | Keane et al. ............ 709/245 |
| 2002/0078198 | A1 | 6/2002 | Buchbinder et al. |
| 2002/0091859 | A1 * | 7/2002 | Tuomenoksa et al. ......... 709/245 |
| 2002/0099937 | A1 * | 7/2002 | Tuomenoksa ............ 713/153 |
| 2002/0103931 | A1 * | 8/2002 | Mott ............ 709/245 |
| 2002/0133534 | A1 * | 9/2002 | Forslow ............ 709/200 |
| 2003/0018912 | A1 | 1/2003 | Boyle et al. |
| 2003/0041091 | A1 * | 2/2003 | Cheline et al. ............ 709/200 |
| 2003/0041136 | A1 * | 2/2003 | Cheline et al. ............ 709/223 |
| 2003/0055978 | A1 | 3/2003 | Collins |
| 2003/0065785 | A1 | 4/2003 | Jain |
| 2003/0074472 | A1 * | 4/2003 | Lucco et al. ............ 709/245 |
| 2003/0084162 | A1 | 5/2003 | Johnson et al. |
| 2003/0123421 | A1 | 7/2003 | Feige |
| 2003/0131131 | A1 * | 7/2003 | Yamada et al. ............ 709/238 |
| 2003/0152068 | A1 * | 8/2003 | Balasaygun et al. ......... 370/356 |
| 2003/0208554 | A1 | 11/2003 | Holder |
| 2003/0212795 | A1 | 11/2003 | Harris et al. |
| 2003/0219000 | A1 | 11/2003 | Magret |
| 2004/0006708 | A1 * | 1/2004 | Mukherjee et al. ............ 713/201 |
| 2004/0088542 | A1 * | 5/2004 | Daude et al. ............ 713/156 |
| 2004/0111612 | A1 * | 6/2004 | Choi et al. ............ 713/163 |
| 2004/0148439 | A1 * | 7/2004 | Harvey et al. ............ 709/249 |
| 2006/0190607 | A1 * | 8/2006 | Lowery et al. ............ 709/226 |
| 2006/0195524 | A1 * | 8/2006 | Nichols et al. ............ 709/204 |
| 2006/0195539 | A1 * | 8/2006 | Nichols et al. ............ 709/206 |
| 2006/0212545 | A1 * | 9/2006 | Nichols et al. ............ 709/219 |
| 2006/0212599 | A1 * | 9/2006 | Lucco et al. ............ 709/245 |
| 2007/0286189 | A1 * | 12/2007 | Kreiner et al. ............ 370/389 |
| 2008/0232295 | A1 * | 9/2008 | Kreiner et al. ............ 370/313 |
| 2009/0116487 | A1 * | 5/2009 | Read ............ 370/392 |

OTHER PUBLICATIONS

Tsuchiya, et al., Extending the IP Internet Through Address Reuse, ACM SIGCOMM Computer Communication Review, pp. 16-33, Jan. 1993.

Francis, et al., IPNL: A NAT-Extended Internet Architecture, SIGCOMM'01, Aug. 27-31, 2001, pp. 69-79.

Yalagandula, et al., Transparent Mobility with Minimal Infrastructure, University of Texas at Austin, pp. 1-14, Jul. 2001.
Teraoka, et al., VIP: A Protocol Providing Host Mobility, Communications of the ACM, Aug. 1994/vol. 37, No. 8, pp. 67-75, 113.
Egevang, et al., The IP Network Address Translator (NAT), Network Working Group, RFC 1631, May 1994, pp. 1-10.
Chatel, Classical Versus Transparent IP Proxies, Network Working Group, RFC 1919, Mar. 1996, pp. 1-35.
Finseth, An Access Control Protocol, Sometimes Called TACACS, Network Working Group, Jul. 1993, pp. 1-18.
Computer Nelowrks. Third Edition, by Andrew S. Tanenbaum, 1996, pp. 643-670, 685-691.
Perkins, Mobile IP, IEEE Communications Magazine, May 1997, pp. 84-99.
"Non-Final Office Action", U.S. Appl. No. 10/233,288, (Dec. 21, 2009), 13 pages.
"Final Office Action", U.S. Appl. No. 10/403,518, (Feb. 2, 2010), 26 pages.
"Final Office Action", U.S. Appl. No. 10/403,829, (Feb. 23, 2010), 15 pages.
"Advisory Action", U.S. Appl. No. 10/403,829, (May 14, 2010), 2 pages.
"Non Final Office Action", U.S. Appl. No. 10/161,573, (May 26, 2009),39 pages.
"Non Final Office Action", U.S. Appl. No. 10/403,829, (Jun. 22, 2009),26 pages.
Francis, Gummadi "IPNL: A NAT-Extended Internet Architecture", *SIGCOMM '01*, (Aug. 2001),69-79.
"Final Office Action", U.S. Appl. No. 10/161,573, (Jul. 23, 2010), 21 pages.
"Final Office Action", U.S. Appl. No. 10/233,288, (Aug. 3, 2010), 15 pages.
"Non Final Office Action", U.S. Appl. No. 10/403,518, (Aug. 3, 2010), 30 pages.
"Advisory Action", U.S. Appl. No. 10/233,288, (Oct. 15, 2010), 3 pages.
Tanenbaum, Andrew S., "Computer Networks", Third Edition,(1996),1-37.
Chatel, M "Classical versus Transparent IP Proxies", *Network Working Group Request for Comments*, (Mar. 1996),1-35.
Finseth, C "An Access Control Protocol , Sometimes Called TACACS", *Network Working Group Request for Comments*, (Jul. 1993),1-18.
Francis, Paul et al., "IPNL: A NAT-Extended Internet Architecture", *SIGCOMM'01*, (Aug. 1, 2008),69-79.
Perkins, Charles E., "Mobile IP", *IEEE Communications Magazine*, Sun Microsystems,(May 1997),84-99.
Teraoka, Fumio et al., "VIP: A Protocol Providing Host Mobility", *Communications of the ACM*, vol. 37, No. 8,(Aug. 1994),67-75, 113.
Tsuchiya, Paul F., et al., "Extending the IP Internet Through Address Reuse", *ACM SIGCOMM Computer Communication Review*, (January 1993),16-33.
Venters, Tracy "Demystifying Protocols: A Comparison of Protocols Suitable for IP Telephony", *Sonus Networks*, (2000),1-11.
Yalagandula, Praveen et al., "Transparent Mobility with Minimal Infrastucture", *University of Texas at Austin*, (Jul. 2001),1-14.
Kessler, Gary C., "Mobile IP: Harbiner of Untethered Computing," http://www.garykessler,net/librarymobileip.htm, Jan. 20, 2004.
Rekhter, "Cisco Systems' Tag Switching Architecture overview," Network Working Group, Feb. 1997.
Kent, "Security Architecture for the Internet Protocol," Network Working Group, Nov. 1998.
Computer Dictionary; Microsoft Press; 3rd Edition; 1997; p. 264.
K. Egevang and P. Francis, RFC 1631, The IP Network Address Translator (NAT), May 1994.
"Non Final Office Action", U.S. Appl. No. 10/403,829, (Nov. 19, 2010),19 pages.

* cited by examiner

Prior Art

| Field Name | Description |
|---|---|
| Protocol Version | Version information |
| Data Type | Type of data following Shim |
| Header Option Flags | Option Flag Information |
| Source RD Public IP | Source Route Director gIP |
| Dest RD Public IP | Destination Route Director gIP |
| Source Member pIP | Source Member Private IP |
| Dest Member pIP | Destination Member Private IP |

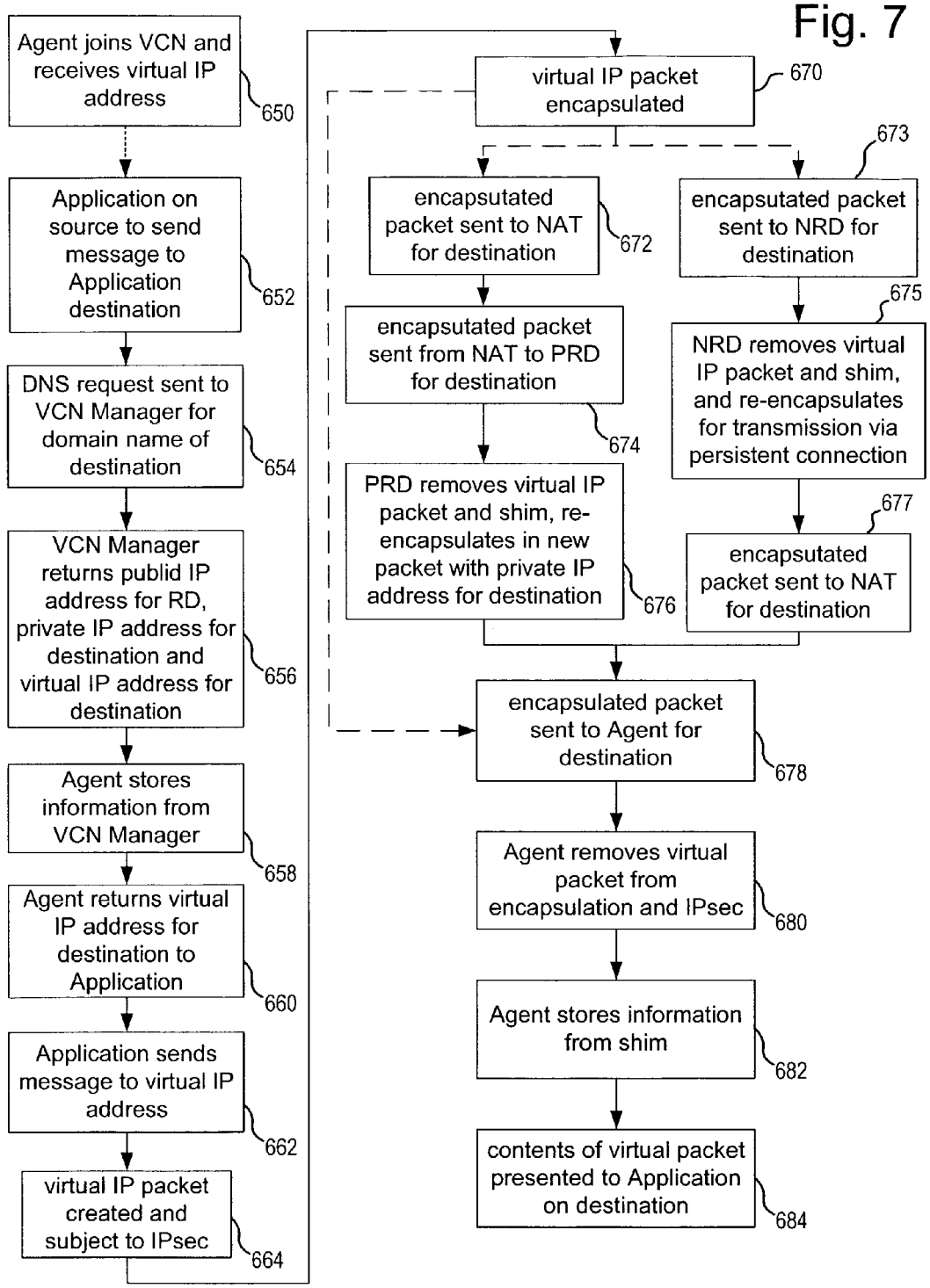

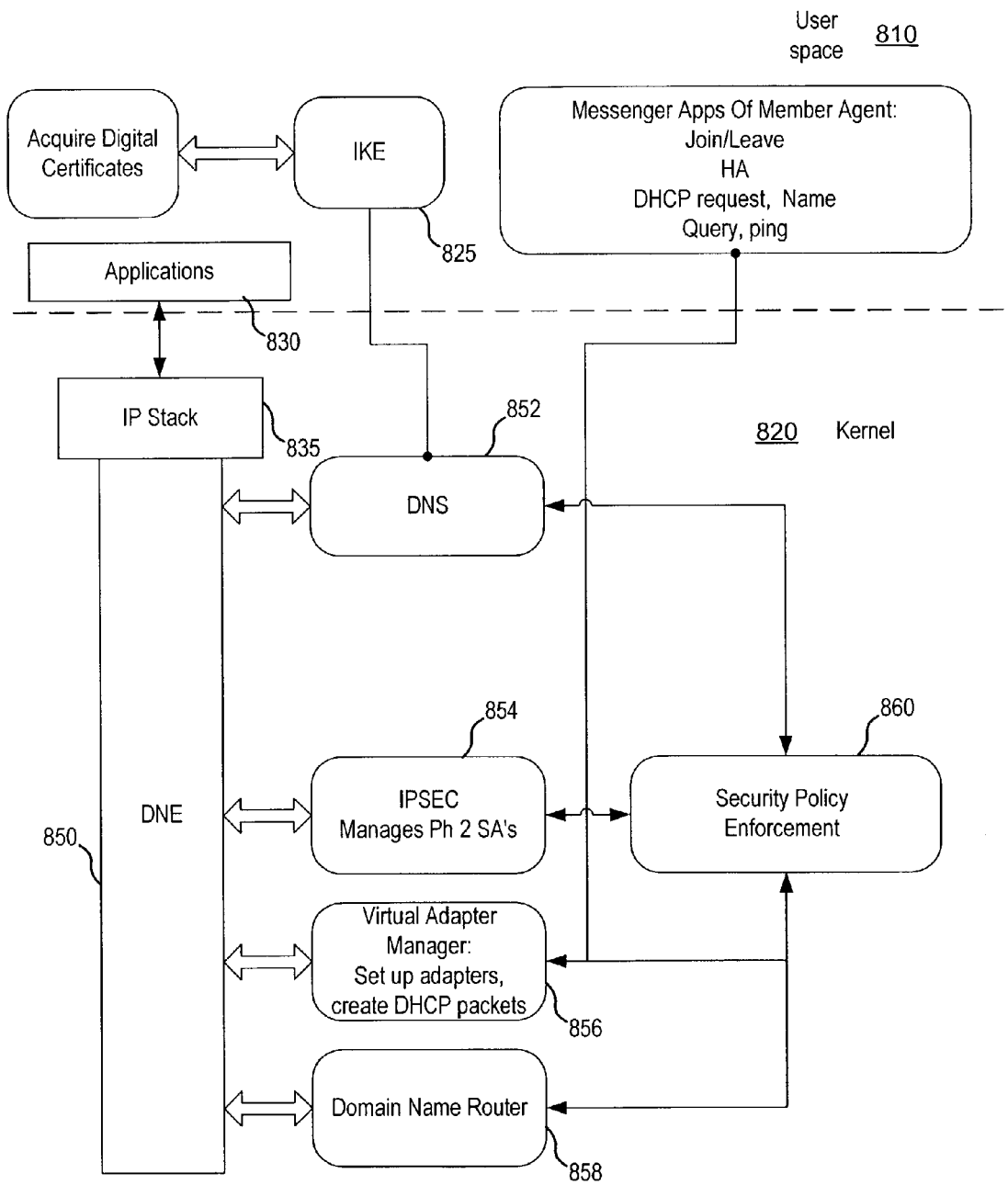

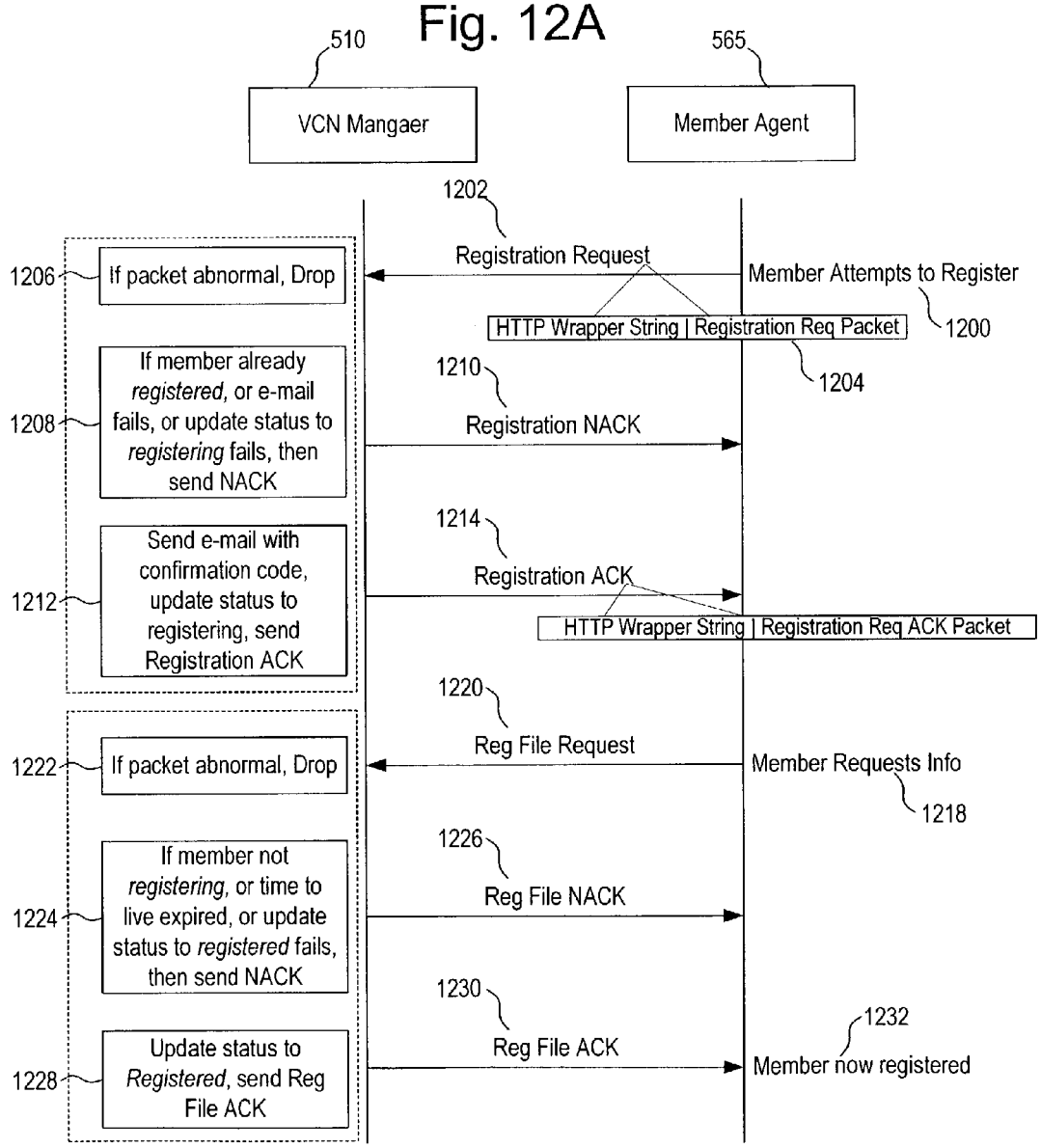

Fig. 12B

| Field Name | Type | Description |
|---|---|---|
| Manager Seed | Array (32) | From Init Ack |
| Init Ack Time | Uint (8) | From Init Ack |
| Join Flags | Uint (2) | Indicates if rejoin and/or Group |
| Member Local IP | Uint (4) | The machine's local IP address |
| RD Local IP | Uint (4) | The Route Director local IP address |
| RD Global IP | Uint (4) | The Route Director Global IP |
| <Unused> | Uint (4) | |
| Member AH SPI | Uint (4) | For IPsec |
| Member ESP SPI | Uint (4) | For IPsec |
| Member Listen Port | Uint (2) | For Heartbeat Protocol |
| Token Timestamp | Uint (8) | The UTC time Token Key was created |
| Member Run ID | Array (16) | GUID Identifying current client run |
| Member Netbios Name | Array (16) | Microsoft NetBios support |
| SP Version | Uint (4) | Security Policy version |
| HA Version | Uint (4) | High availability version |
| Password Hash | Uint (20) | SHA1 of the user password string |
| Padding | Uint (.) | End on a multiple of 16 octets |

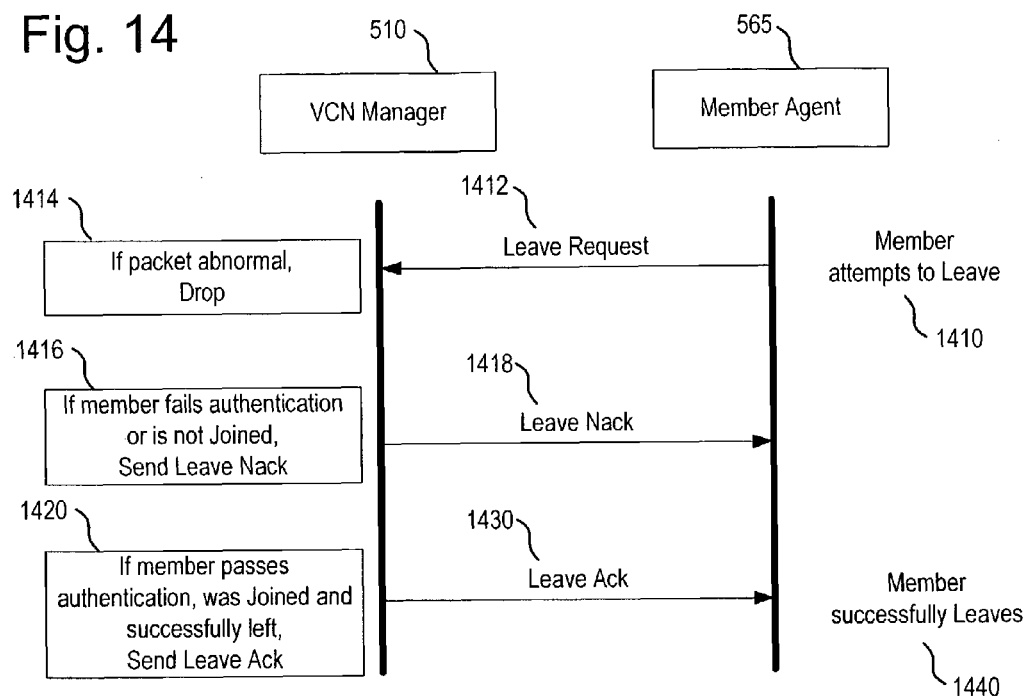
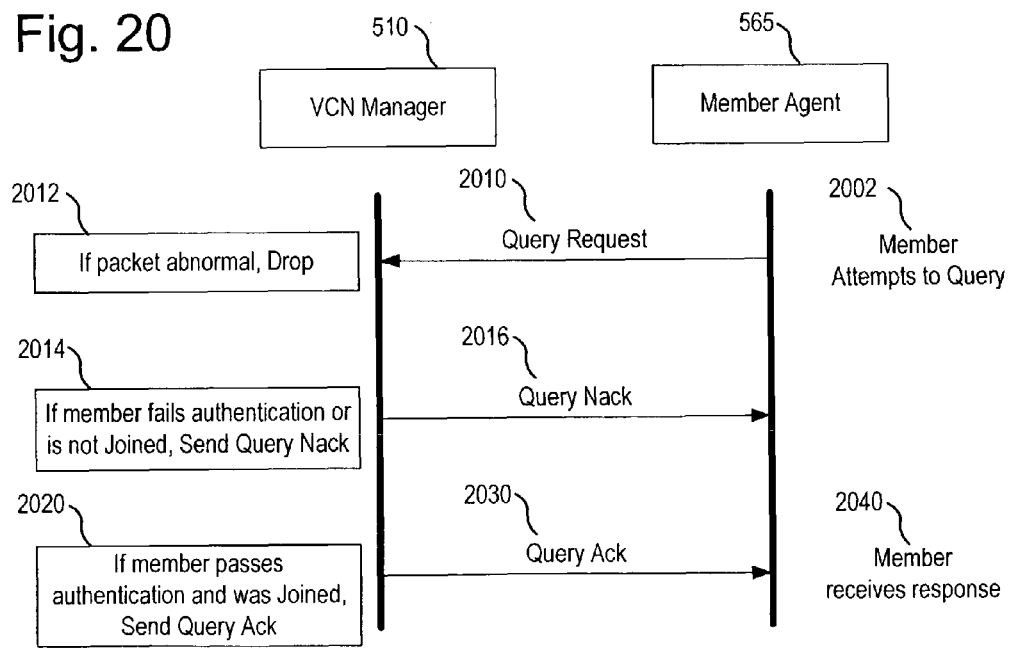

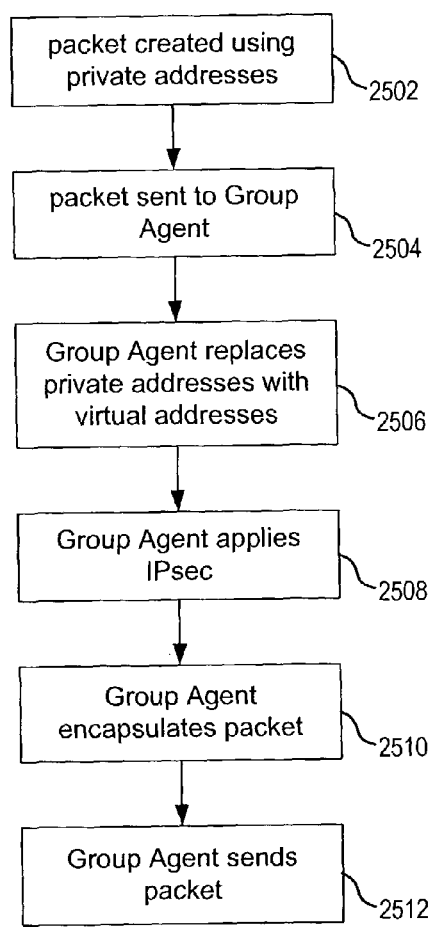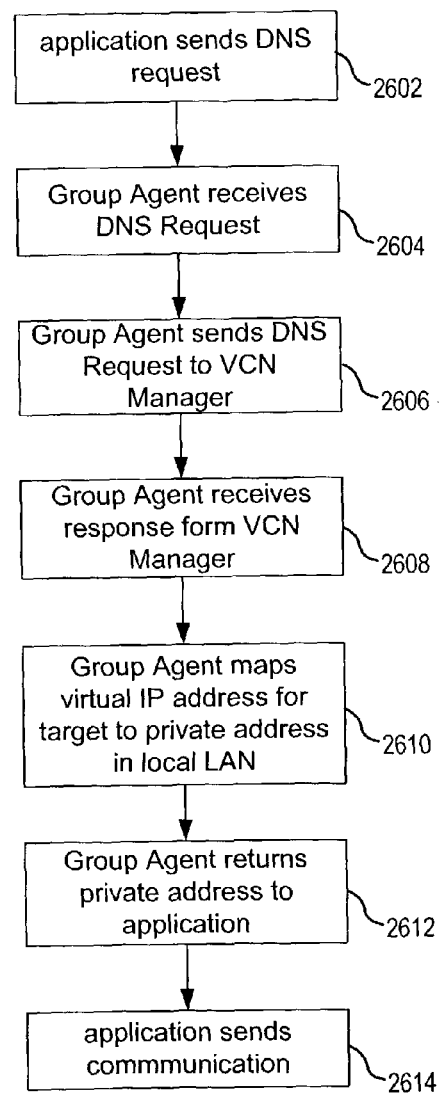

SECURE VIRTUAL COMMUNITY NETWORK SYSTEM

CROSS-REFERENCE TO RELATED APPLICATIONS

This Application is related to the following Applications: U.S. Pat. No. 7,139,828 issued Nov. 21, 2006; U.S. patent application Ser. No. 10/161,573, "Creating A Public Identity For An Entity On A Network," filed on Jun. 3, 2002; U.S. patent application Ser. No. 10/233,288, "Communicating With An Entity Inside A Private Network Using An Existing Connection To Initiate Communication," filed on Aug. 30, 2002; U.S. patent application Ser. No. 10/403,829 "Secure Virtual Address Realm," filed on Mar. 31, 2003; and U.S. patent application Ser. No. 10/403,518 "Group Agent," filed on Mar. 31, 2003. All of these related applications are incorporated herein by reference in their entirety.

BACKGROUND OF THE INVENTION

1. Field of the Invention

The present invention is directed to a network services system.

2. Description of the Related Art

Networked data devices provide users with efficient means for communication and collaboration. In recent years, the Internet has played a central role in allowing different types of networked devices to connect and share information across a myriad of networks. As technology advances and more organizations and people rely on the Internet, new challenges are presented for enhancing the ability to communicate. One such challenge is to enable the rapid creation of a secure means that allows local and remote specified entities to communicate and collaborate from any location via a standard Internet connection. For any solution to be widely accepted, it must take into account the realities and limitations currently existing.

For communication on the Internet, the Internet Protocol (IP) has become the default protocol used by most hosts and to which communication applications are now written. To transmit data from a source to a destination, the Internet Protocol uses an IP address. An IP address is four bytes long and consists of a network number and a host number. When written out, IP version 4 addresses are specified as four numbers separated by dots (e.g. 198.68.70.1). Users and software applications do not always refer to hosts or other resources by their numerical IP address. Instead of using numbers, they use ASCII strings called domain names. The Internet uses a Domain Name System (DNS) to convert a domain name to an IP address.

The Internet Protocol has been in use for over two decades. It has worked extremely well, as demonstrated by the exponential growth of the Internet. Unfortunately, the Internet is rapidly becoming a victim of its own popularity, it is running out of addresses.

One popular solution to the depleting address problem is Network Address Translation (NAT). This concept includes predefining a number of network addresses to be private addresses and public addresses. Public addresses are unique addresses that should only be used by one entity having access to the Internet. That is, no two entities on the Internet should have the same public address. Private addresses are not unique and are typically used for entities not having direct access to the Internet. Private addresses are used in private networks. Private addresses can be used by more than one organization or network. NAT assumes that all of the machines on a network will not need to access the Internet at all times. Therefore, there is no need for each machine to have a public address. A local network can function with a small number of one or more public addresses assigned to a NAT device. The remainder of the machines on the network will be assigned private addresses. Since entities on the network have private addresses, the network is considered to be a private network.

When a particular machine having a private address on the private network attempts to initiate a communication to a machine outside of the private network (e.g. via the Internet), the NAT device will intercept the communication, change the source machine's private address to a public address and set up a table for translation between public addresses and private addresses. The table can contain the destination address, port numbers, sequencing information, byte counts and internal flags for each connection associated with a host address. Inbound packets are compared against entries in the table and permitted through the NAT device only if an appropriate connection exists to validate their passage. One problem with a many NAT implementations is that it only works for communication initiated by a host within the private network to a host on the Internet that has a public IP address. Many NAT implementations will not work if the communication is initiated by a host outside of the private network and is directed to a host with a private address in the private network.

For most organizations, the security of devices coupled to the Internet is a concern. As a result, not all devices are directly connected to or accessible via the Internet. Rather, many devices are placed in private networks for security concerns (in addition to the address usage issue described above). Many private networks are secured by placing a firewall device between the private network and the Internet.

Another problem with many current communication schemes is that mobile computing devices can be moved to new and different networks, including private networks. These mobile computing devices may need to be reachable so that a host outside of the private network can initiate communication with the mobile computing device. However, in this case the problem is two-fold. First, there is no means for allowing the host outside of the private network to initiate communication with the mobile computing device. Second, the host outside the private network does not know the address for the mobile computing device or the network that the mobile computing device is currently connected to.

Thus, there is a need for a system that provides for local and remote entities to communicate and collaborate using the Internet, can work with existing NAT devices and firewalls, and allows for devices to move to different physical networks. To increase the ability of such a system to be accepted by the Internet community, it is desirable for such a system to not require changes to existing applications, allow peer-to-peer applications to communicate directly across the Internet and to not require changes to existing protocols. Each of these issues will be discussed below.

Large amounts of resources have been used to purchase and deploy existing applications currently running on the millions of computing devices. Organizations and individuals are not likely to want to adopt new communications solutions that require them to absorb the additional cost of replacing all of their applications.

To provide efficient and secure communication, it is desirable for devices to have the ability to allow their IP based applications to communicate directly with each other. By allowing peer-to-peer applications to communicate directly across the Internet, security is enhanced since the recipient is specifically identified and communication is passed directly between the applications on two or more respective machines.

Most machines on the Internet use the TCP/IP (Transmission Control Protocol/Internet Protocol) reference model to send data to other machines on the Internet. The TCP/IP reference model includes four layers: the physical and data link layer, the network layer, the transport layer, and the application layer. The physical layer portion of the physical and data link layer is concerned with transmitting raw bits over a communication channel. The data link portion of the Physical and Data Link layer takes the raw transmission facility and transforms it into a line that appears to be relatively free of transmission errors. It accomplishes this task by having the sender break the input data up into frames, transmit the frames and process the acknowledgment frames sent back by the receiver.

The network layer permits a host to inject packets into a network and have them travel independently to the destination. On the Internet, the protocol used for the network layer is the Internet Protocol (IP).

The transport layer is designed to allow peer entities on the source and destination to carry on a "conversation." On the Internet, two protocols are used. The first one, the Transmission Control Protocol (TCP), is a reliable connection-oriented protocol that allows a byte stream originating on one machine to be delivered without error to another machine on the Internet. It fragments the incoming byte stream into discrete segments and passes each one to the network layer. At the destination, the receiving TCP process reassembles the received segments into the output stream. TCP also handles flow control to make sure a fast sender cannot swamp a slow receiver with more segments than it can handle. The second protocol used in the transport layer on the Internet is the User Datagram Protocol (UDP), which does not provide the TCP sequencing or flow control. UDP is typically used for one-shot, client server type requests-reply queries for applications in which prompt delivery is more important than accurate delivery.

The transport layer is typically thought of as being above the network layer to indicate that the network layer provides a service to the transport layer. Similarly, the transport layer is typically thought of as being below the application layer to indicate that the transport layer provides a service to the application layer.

The application layer contains the high level protocols, for example, Telnet, File Transfer Protocol (FTP), Electronic Mail-Simple Mail Transfer Protocol (SMTP), and Hypertext Transfer Protocol (HTTP).

FIG. 1 depicts the basic structure of an IP version 4 packet 10 used at the Network Layer. IP packet 10 consists of header 12 and payload 14. Payload 14 stores the data received from the Transport Layer in the TCP/IP model. FIG. 2A depicts the format of a header of an IP packet. The header is depicted to include six rows. The first five rows are 32 bits wide. The first five rows of the header comprise a 20 byte fixed portion of the header. The last row of the header provides a variable sized options field 22. Version field 24 keeps track of which version of the protocol the packet belongs to. The current version used on the Internet is version 4. IHL field 26 describes the length of the header in 32 bit words. Type field 28 indicates the type of service requested. Various combinations of reliability and speed are possible. Length field 30 contains the size of the packet, including both the header and the data. Identification field 32 is needed to allow the destination host to determine which packet the received fragment belongs to. All fragments of a packet contain the same identification value. Next comes three flags, which include an unused bit 33 and then two 1 bit fields 34 and 36. DF field 34 stands for don=t fragment. It is an order to the routers not to fragment the packet because the destination is incapable of putting the pieces back together again. MF field 36 stands for more fragments. All fragments except for the last one have this bit set. Fragment offset field 38 indicates where in the current segment this fragment belongs. Time to Live field 40 is used to limit packet lifetime. It is supposed to count time in seconds, allowing a maximum life time of 255 seconds. In practice, it may count hops (or hops and seconds). The time is decremented on each hop by a router. When the time to live hits 0, the packet is discarded and a warning is sent back to the source using an Internet Control Messaging Protocol (ICMP) packet. This feature prevents packets from wandering around forever. Protocol Field 42 indicates which transport layer type is to receive the segment. TCP is one possibility, UDP is another. Checksum field 44 verifies the header. One method for implementing a checksum is to add up all 16 bit half words constituting the header and take the ones compliment of the result. Note that the checksum must be recomputed at each hop because the Time to Live field 40 changes or the content of the options field changes. Source field 46 indicates the IP address for the source of the packet and destination field 48 indicates the IP address for the destination of the packet. Options field 22 is a variable length field designed to hold other information. Currently, options used on the Internet indicate security, suggested routing path, previous routing path and time.

UDP is an alternative to TCP. FIG. 2B depicts the structure of a packet that uses UDP. Like the TCP, UDP uses the Internet Protocol to actually send a data unit from one computer to another. Unlike TCP, however, UDP does not provide the service of dividing a message into packets (datagrams) and reassembling it at the other end. Specifically, UDP does not provide sequencing of the packets that the data arrives in. Hence, application programs using UDP must ensure that the entire message has arrived and is in the right order. As shown in FIG. 2B, the packet includes an IP header 12a and IP payload 14a. The payload 14a comprises the UDP header 50 and UDP data 60. UDP header 50 consists of a 16 bit source port identifier, a 16 bit destination port identifier, a length field and checksum field. In FIG. 2B, the Destination Port has a meaning within the context of a particular Internet destination address, and the Length field is the length in octets of this user datagram, including its header and the data. The checksum is the 16-bit one's complement of the sum of consecutive two octaves of a pseudo header of information from the IP header, the UDP header, and the data (padded with zero octets at the end, if necessary, to make a multiple of two octets).

In addition to using the existing Internet infrastructure, another issue in allowing public-to-private, or private-to-private, communications lies in the addressing of the devices. Where a system is coupled to the public Internet with an IP address, communication packets can be routed directly to the machine. However, many devices couple to the Internet via service providers which provide them with a dynamic IP address. Thus, those wishing to communicate with this type of user must know the constantly changing address of the user in order to communicate with them. Still other hosts may be coupled to networks that use technologies other than IP.

One solution currently in use that provides for local and remote specified entities to communicate and collaborate using the Internet is the Virtual Private Network ("VPN"). The VPN uses additional network software layers to increase security between users in the public realm and those in private realms. For example, some VPNs encrypt packets using IPsec (or other protocols). The encrypted packets are then encapsulated within a standard packet and transmitted across the Internet to the destination. At the destination, the encrypted packet is decrypted. While the existing VPN provides remote users with secure access to a network, via the Internet, many existing VPNs have various shortcomings that prevent them from satisfying the needs of many users. For example, many VPNs do not provide for peer-to-peer communication with IPsec (or other security measures), do not work though NAT devices in all cases, are difficult to set up and maintain, do not provide for full mobility of entities communicating on the VPN, and do not always provide for communication with entities in the various private network configurations discussed herein.

One method of overcoming the mobility problem includes the use of Dynamic DNS. More information about Dynamic DNS can be found in RFC 2136 incorporated herein by reference.

Dynamic DNS is illustrated in FIG. 3. FIG. 3 shows a first computer or device B having a host name of B.COb.com having a dynamic or static private IP address IPb and a second computer or device A having a host name of A.COa.com and having a dynamic or static private IP address IPa. Devices B and A are coupled to the Internet 506 via firewall devices 302, 304 incorporating NAT. The addresses of B and A, as seen by devices on the Internet, are public IP addresses GIPb and GIPa, respectively. Also shown is device D, having a publicly address IPd and a host name of d.COd.com.

Also shown is a Dynamic DNS server, DDNS, residing on the Internet. In essence, the DDNS server is a DNS server supporting the dynamic DNS protocol of RFC 2136, and in this example is an authoritative name server containing records for B, A and D. The DDNS server will update it's records of B, A and D in real time, so that if or when D's address IPd changes, any query by other devices (B, A, for example) based on D's host name, will result in the response being the correct IP-IPd. Any DNS records for devices B and A will always reflect the public IP addresses (GIPa and GIPb) of the firewall/NAT devices.

Unfortunately, DDNS technology is complex and difficult to implement securely—two factors that have dramatically slowed the rate of deployment of Dynamic DNS. As a result, VPNs have not been able to adopt DDNS to solve all of the problems discussed herein.

Hence, a system is desired that allows local and remote entities to communicate and collaborate from any location via a standard Internet connection and which solves the problems discussed above.

SUMMARY OF THE INVENTION

A system is disclosed that allows local and remote entities to communicate and collaborate from various locations. In one embodiment, the system makes use of a virtual subnet with a virtual address realm. The virtual address realm allows two or more users to communicate securely via at least one public network, whether the users are both coupled directly to the public network, both coupled directly to separate private networks or whether one is in a public network and one is in a private network. The virtual address realm uses virtual addresses to identify the devices on the virtual subnet. Although the devices are in different physical subnets, from the point of view of the applications the devices of the virtual subnet appear to be in one local subnet.

In one embodiment, the virtual address realm comprises a virtual address realm definition including at least a set of users. Each user accessing the virtual address realm may have at least one virtual address in the virtual address realm and at least one physical address.

Another embodiment of the present invention comprises a virtual community network for transmitting communications via at least one physical network. The virtual community network comprises a virtual address realm including a logical name assignment, a set of users capable of communicating in the virtual address realm, and a secure communication channel. In a further aspect, the virtual community network logical name is a domain name, and the domain name may be a fully qualified domain name or a virtual domain name. In another aspect, the set of users includes at least a first user coupled to a first private physical network and a second user coupled to a second private physical network, and the first private physical network and the second private physical network may have at least one common private physical subnet address. The physical addresses may be dynamic or static.

Yet another embodiment of the invention is a method comprising the steps of: defining a virtual address realm overlying a public address realm, the virtual address realm including at least a user set and a logical name for said user set; and routing communications between users in the user set by means of virtual address realm addresses. In a further aspect, this method includes the step of registering users in the user set as members of the virtual address realm. Further, the method may include the step of assigning each registered user a unique virtual address in the virtual address realm. The method may further include the steps of encrypting communications between devices in the realm, and/or applying at least one address realm group policy.

A further embodiment of the invention is a method for providing secure communications between two devices. The method comprises the steps of: providing a virtual realm identifier; defining a set of users for the virtual realm; registering users in the realm; assigning virtual addresses; and routing information between users in said virtual address realm.

A still further embodiment of the invention comprises one or more processor readable storage devices having processor readable code embodied on said processor readable storage devices. In this embodiment, said processor readable code is for programming one or more processors to perform a method comprising the steps of: providing a virtual address realm configuration including a user set and a domain name for said user set; and routing communications between users in said virtual address realm.

Another embodiment of the invention comprises a method for providing a secure virtual network. The method may include the steps of: providing a virtual network manager coupled to a public network; defining a member set of users entitled to communicate in the virtual network; registering members with the manager; assigning members a virtual address; and routing network traffic between the members in the virtual community.

An additional further embodiment of the invention may comprise one or more processor readable storage devices having processor readable code embodied on said processor readable storage devices. The processor readable code may be for programming one or more processors to perform a method comprising the steps of: managing a virtual community network realm; defining a member set of users entitled to communicate in the virtual community; registering users with the virtual community; assigning each user a virtual address; and routing network traffic between the users in the virtual community.

Another embodiment of the invention is a virtual community network system. The system includes a virtual network manager including at least one virtual community definition comprising at least a domain name and a user set; and at least one route director capable of communicating with users in the user set.

In a further aspect, the virtual community network includes a communication agent installed on a device. The agent may comprise a virtual network adapter interfacing with the device and applications on the device to route traffic to members of the virtual community via their virtual address.

For some devices, additional software or hardware cannot be installed on a member device or it is not desirable to install such additional software or hardware on the device. For such devices, a Group Agent can be used. The Group Agent acts as a proxy for one or more members of a virtual community without requiring installation of member agent software on the client devices.

One embodiment of a system that uses a Group Agent includes communicating with a first client and acting as an intermediary between the first client and members in a first virtual address realm so that the first client can communicate in the first virtual address realm. Note that in this embodiment the first client is not configured to communicate in the first virtual address realm. For example, no software is installed on the client to add drivers, layers or interfaces specific to the first virtual address realm.

Another embodiment of a system using a Group Agent includes communicating messages with a first client and communicating the messages with members in a virtual address realm on behalf of the first client. While communicating with the first client, the messages do not use virtual addresses. During the communication process, the messages are transformed so that the messages include virtual addresses when communicating with members in the virtual address realm and the messages do not include virtual addresses when communicating with the first client.

In one implementation, the first entity resides in a first physical address realm and the second entity resides in a second physical address realm, where the first physical address realm overlaps with the second physical address realm. For example, consider the situation where the first physical address realm is a first private network using a first set of private addresses and the second physical address realm is a second private network using a second set of private addresses, where there are private addresses that exist in both the first set of private addresses and the second set of private addresses.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or one or more communication interfaces.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which:

FIG. 7 is a flow chart describing the overall process for communicating.
FIG. 8 is a block diagram illustrating the structure of the Member Agent application in the system of the present invention.
FIG. 11 depicts an HTTP wrapper structure.
FIG. 12A is a flow diagram depicting a user registration process of the present invention.
FIG. 12B is a table illustrating the structure of the registration file information structure.
FIG. 14 is a flowchart depicting a member leave request in accordance with the present invention.
FIG. 20 is a flow diagram depicting a query request in the system of the present invention.
FIG. 25 is a flow chart describing one embodiment of a process for communicating using a Group Agent.
FIG. 26 is a flow chart describing one embodiment of a process for initiating communication by a member that is using a Group Agent.

DETAILED DESCRIPTION

One embodiment of the present invention provides for a secure Virtual Community Network or "VCN." In essence, a VCN is a private dynamic network which acts as a private LAN for computing devices coupled to public networks or private networks. This enables computing devices anywhere in the world to join into private enterprise intranets and communicate with each other. Thus, the invention provides a separate private virtual address realm, seen to each user as a private network while seamlessly crossing public and private network boundaries.

Figure 1:
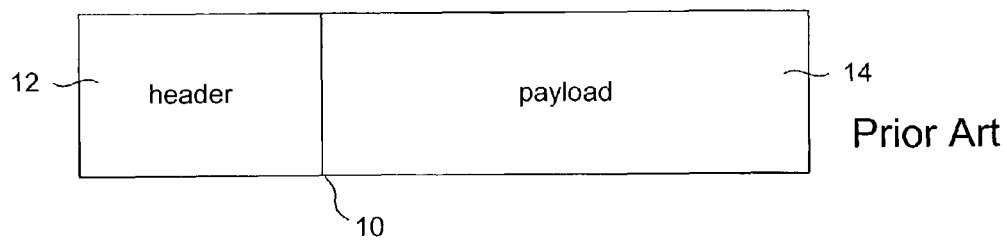
FIG. 1 depicts an IP packet.
Figure 2A:
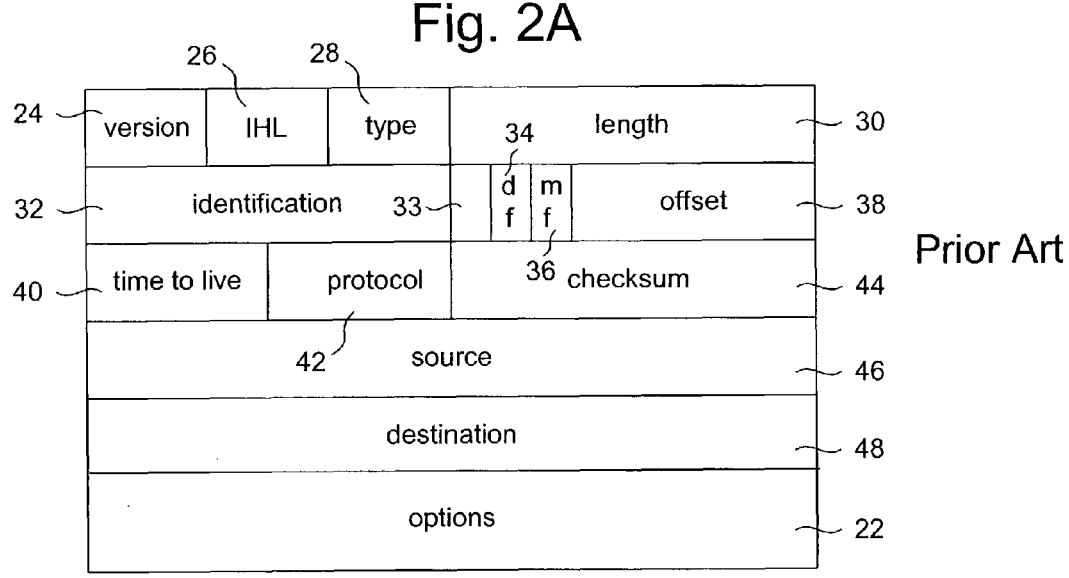
FIG. 2A depicts the format of a header of an IP packet.
Figure 2B:
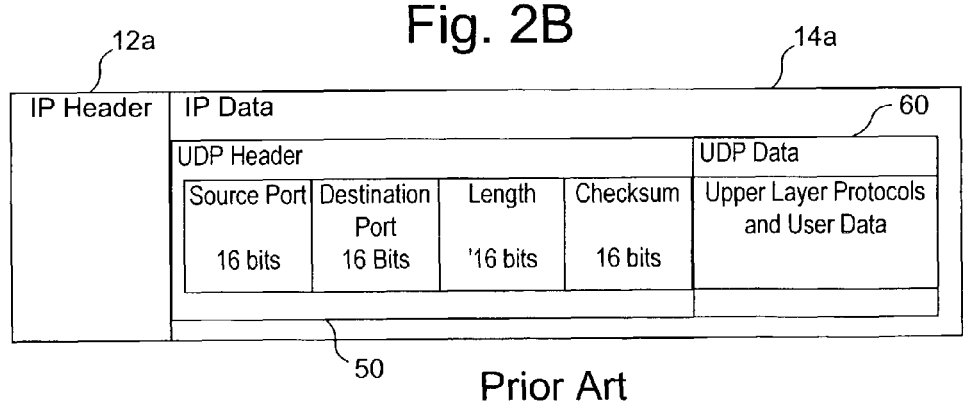
FIG. 2B depicts the format of a UDP packet.
Figure 3:
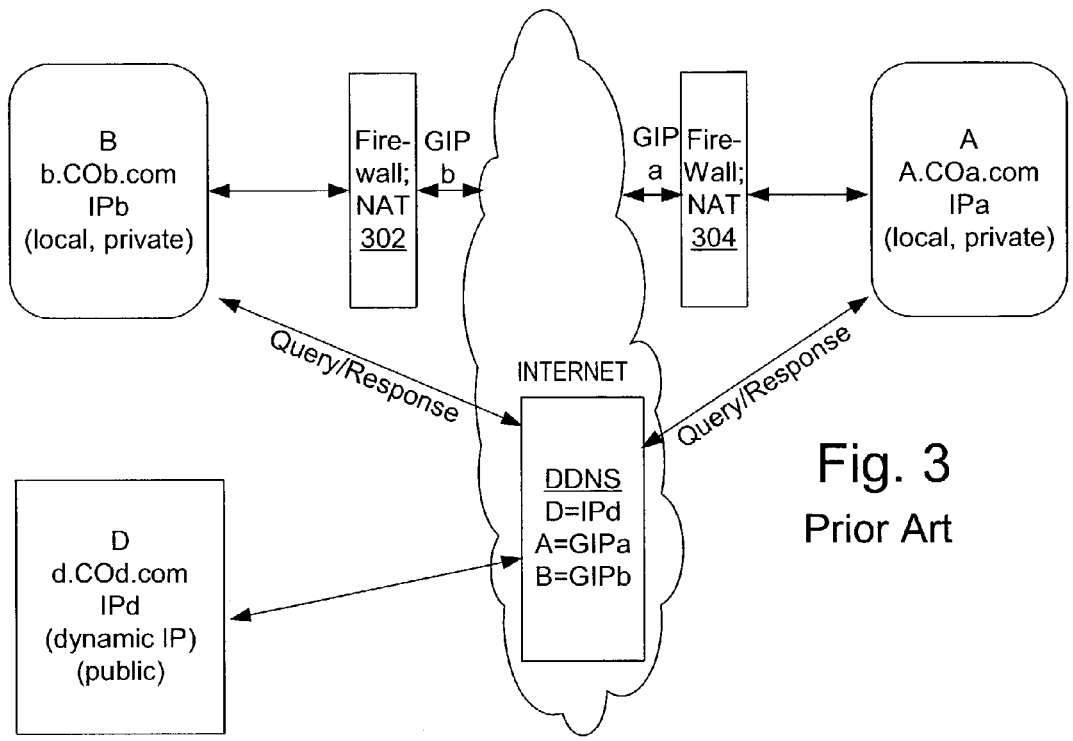
FIG. 3 depicts a print-out implementation of a dynamic routing system.
Figure 4:
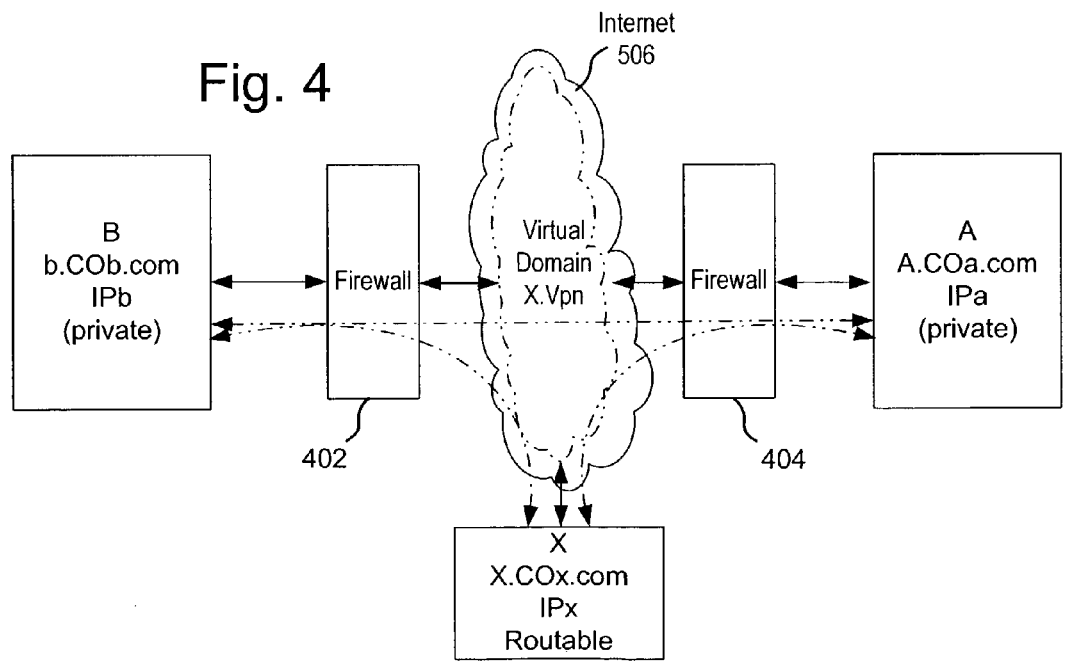
FIG. 4 depicts a block diagram of an implementation of the system of the present invention.

A basic overview of the system is shown in FIG. 4. FIG. 4 shows a computer or device B (host name—b.COb.com) in a first private domain and computer or device A (host name—a.COa.com) in a second private domain, both of which are coupled to the Internet by firewall devices 402, 404. The firewall devices are configured to implement Network Address Translation (NAT). A and B have dynamic or static private IP addresses. Computer or device X is coupled directly to the public Internet and has a public IP address.

In the present invention, a virtual community network (VCN) X.VCN is formed. Machines A, B and X can join the VCN, leave the VCN, or allow other machines in the VCN to communicate with them. More than simply a virtual private network (VPN), all members of the VCN are accessible as if they were part of a physical local network. The application running on the members of the VCN can accomplish what they would be able to accomplish if they were on the same physical routed network (e.g. all in the same private network). Membership in the VCN is controlled by an administrator via an administrative interface. In general, the administrator defines certain aspects of the VCN and then invites members into the VCN by specifying the domain name for each member. Members then register themselves with a VCN Manager, and notify the Manager via join and leave requests when they are available to participate in the community. Once registered and joined, members can communicate with other members as though connected via a local LAN.

As shown in FIG. 4, A, B and X may all make direct connections to each other through communications within the virtual domain. In FIG. 4, dashed lines represent direct communication paths seen to applications running on A, B and X, all "seeing" the virtual addresses of each other and communicating with each other using the application's IP interface.

A hardware architecture for the machines, server or other devices used to implement the present invention should be well understood to one of average skill in the art. Suitable hardware includes one or more processors, a memory, a mass storage device, a portable storage device, a first network interface, a second network interface and I/O devices, in communication with each other. The choice of processor is not critical as long as a suitable processor with sufficient speed is chosen. The memory can be any conventional computer memory. The mass storage device can include a hard drive, CD-ROM or any other mass storage device. The portable storage can include a floppy disk drive or other portable storage device. If the computer is acting as a router, it includes two or more network interfaces. In other embodiments, the computer may include only one network interface. The network interface can include a network card for connecting to an Ethernet or other type of LAN. In addition, one or more of the network interfaces can include or be connected to a firewall. For a gateway, one of the network interfaces will typically be connected to the Internet and the other network interface will typically be connected to a LAN. However, a gateway can exist physically inside a network. I/O devices can include one or more of the following: keyboard, mouse, monitor, display, printer etc. Software used to perform the methods of the present invention are likely to be stored in mass storage (or any form of non-volatile memory), a portable storage media (e.g. floppy disk or tape) and/or, at some point, in memory. The above described hardware architecture is just one suitable example depicted in a generalized and simplified form. The present invention could include dedicated hardware, a dedicated router with software to implement the invention or other software and/or hardware architectures that are suitable.

Figure 5A:
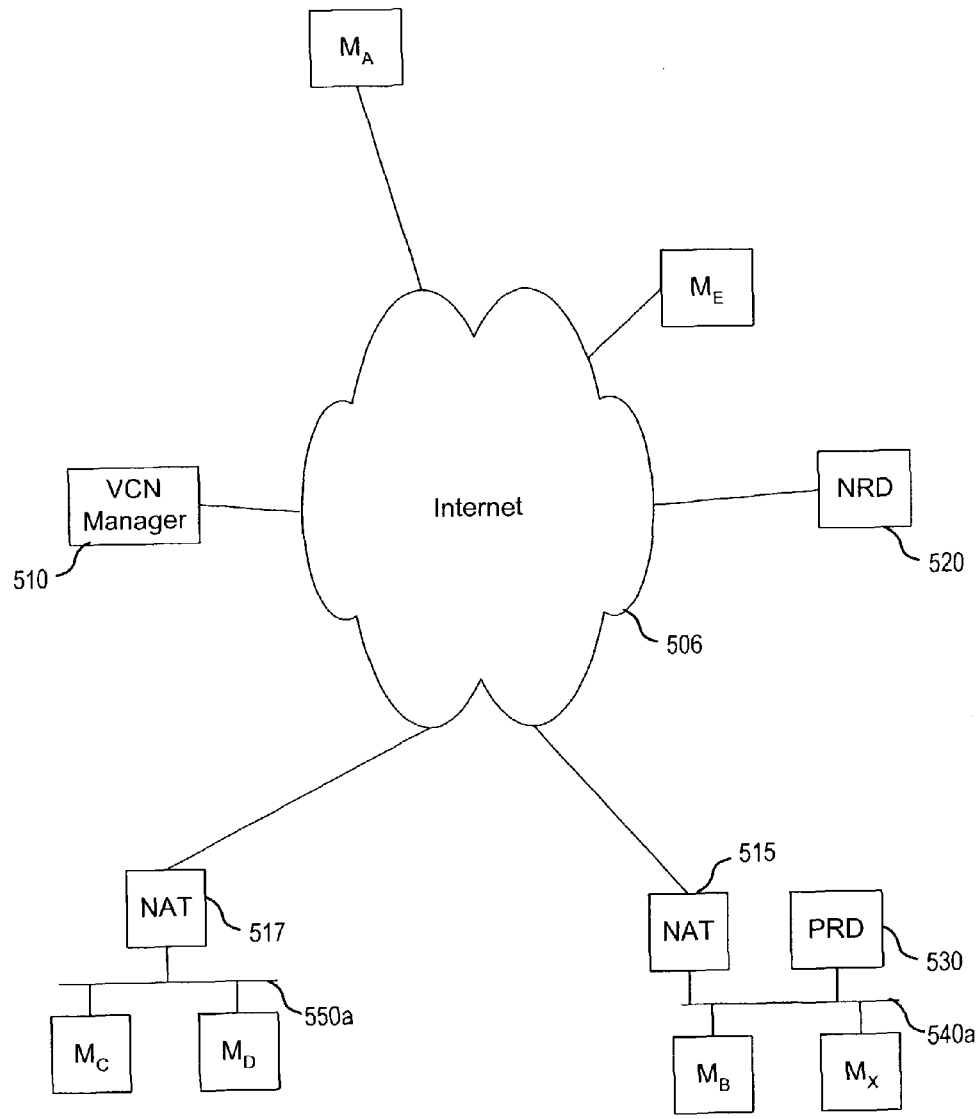
FIG. 5A is a structural network block diagram illustrating elements used in the system of the present invention.
Figure 5B:
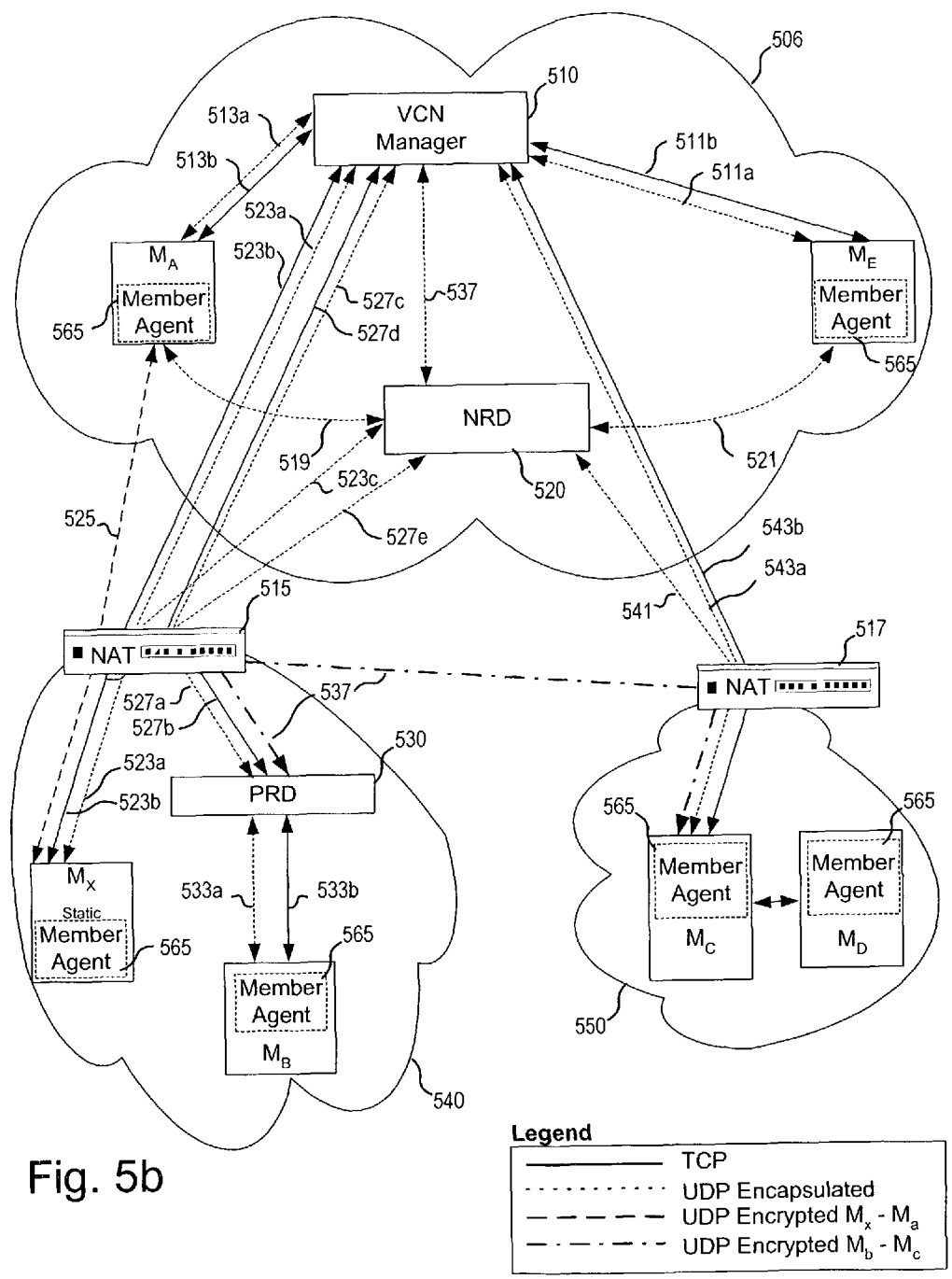
FIG. 5B is a logical block diagram depicting communication types in an implementation of the system of the present invention

A more detailed overview of one embodiment of the present invention is depicted in FIGS. 5A and 5B. FIG. 5A illustrates various embodiments of devices coupled to public and private networks in a manner which allows use of the present invention, and is a representation of a physical connection of such devices. FIG. 5B illustrates a logical representation of elements used to create a VCN and of the various formats of communication traffic between those elements shown in FIG. 5A.

Specifically, FIGS. 5A and 5B illustrate various user machines $M_n$ coupled to the Internet 506, as well as other devices, described below, which implement a virtual community in accordance with the present invention. Devices $M_n$ can be personal computers, servers or other computing devices (mobile or non-mobile). Each machine may have different communication connectivity with the Internet.

In general, an exemplary system for implementing a VCN in accordance with the invention comprises a VCN Manager 510, a Network Route Director 520 and/or Private Route Director 530, and a number of Member Agents 565. Communication between systems in various protocols is illustrated by dashed lines (UDP) and solid lines (TCP). The VCN manager and Network Route Director are shown in FIG. 5A as being coupled directly to Internet 506.

User devices $M_A$ and $M_E$ are connected to the Internet and have public IP addresses. These addresses may be dynamic or static. If static, $M_A$ and $M_E$ can easily communicate with each other in a manner well known in the art by simply addressing IP packets directly to each other. If the addresses are dynamic, then $M_A$ and $M_E$ require some means of knowing when the IP address of the other changes in order to communicate. As described below, the VCN system provides such a means.

Device $M_B$ is in a private domain (e.g. private network) 540 and connected to a NAT Device 515 to access the Internet 506 by a private network path 540a. Device $M_B$ may use have a dynamic or static IP address specific to the private domain 540. Generally, such addresses are part of the private received IP classes which are not routable via the Internet. For example, 10.0.0.0-10.255.255.255, 172.16.0.0-172.31.255.255, 192.168.0.0-192.168.255.255 are network addresses classified for private networks. Firewall/NATdevice 515 translates Machine $M_B$'s private IP address to a routable public IP address. NAT device 515 may include other security functions as well. $M_B$ communicates with other non-VCN devices on the Internet via the NAT device 515, and with other members of the VCN via Private Route Director (PRD) 530, which is coupled to the private network path 540a and is a member of the private network 540. Device $M_X$ is also shown as connected to and a member of the private domain 540 but has a static, routable public IP addresses. As such it may communicate with devices coupled to Internet 506 in a different manner, as illustrated in FIG. 5B.

Devices $M_C$ and $M_D$ are part of a second private domain (e.g. private network) 550 coupled to a second private network path 550a. Again, these machines have static or dynamic private IP addresses and are coupled to the Internet via a firewall/NAT device 517, which is itself coupled to network path 550a.

The VCN Manager 510 is a central server or server cluster providing management services, connection services and security services for the VCN. Each Member Agent 565 includes client agent software (or, in some embodiments, hardware) that runs on end machines and provides virtual network services. It enables the machine to be reached from public and private networks, and implements the security aspects of the system. In FIG. 5B, machines $M_A$, $M_B$, $M_C$, $M_D$, $M_E$ and $M_X$ all include Member Agents and, therefore, can be members of a particular VCN.

The Network Route Director (NRD) 520 is a stand-alone unit that runs on the public side of the Internet enabling Member Agents and Group Agents (discussed below) to be reached inside one or more private networks from the public network. Private Route Director ("PRD") 530 is an element that runs inside a private network enabling access to machines inside the private network from machines outside the private network. It can run as a service on a platform offering other services such as a Windows Server.

Generally, VCNs are defined and managed by the VCN Manager 510. Clients utilize Member Agents or Group Agents to access other client machines ($M_n$), in private or public realms. The NRD or PRD routes communications to Member Agents.

As described herein, three forms of communication are used in creating and implementing the VCN. TCP is used in the registration and joining processes; encapsulated UDP packets are used between elements in establishing communication between joined devices and for management traffic, and Encrypted UDP packets are used for agent-to-agent communications.

FIG. 5B shows exemplary traffic between elements of the VCN. A first type of traffic is TCP traffic. TCP traffic is used between member agents to establish membership in the VCN (the registration process), and make the VCN manager aware they are available to communicate with other members of the VCN (the join process). In FIG. 5B, this is represented by solid lines 513b, 511b, 523b and 543b. TCP is also used: by the PRD 530 to establish communications with the VCN (lines 527b, 527d); and by the member agent of device $M_B$ to communicate with the PRD 530 (line 533b). TCP may also be used by devices $M_C$ and $M_D$ on private network 550 to communicate with each other.

Encapsulated UDP traffic is used by elements of the VCN once membership has been established and the elements are joined in the VCN for management and administrative communications. This is represented in FIG. 5B by lines 511a, 513a, 523a, 527a, 527c, 523c, 527e, 521, 543a, 541, and 519. Encrypted UDP communications are used between devices, shown in FIG. 5B between device $M_X$ and $M_A$ at 525 and device $M_B$ and $M_C$ at 537.

In one embodiment, secure connections are built dynamically using IPsec tunnels based on a virtual IP space that can traverse from private networks, across the Internet and into other private networks. Strong authentication and the establishment of IPsec policies at the time members join the community offers privacy and security to the members of the virtual community. This facilitates the introduction of a variety of policy-based network services with centralized management such as Virtual Private Networks for intranets and extranets, IP-telephony domains, and IP-based PDA communities.

Communication Protocol

In the present invention, an encapsulation routing protocol allows packets to traverse addressing boundaries and identifies routing endpoints by unique DNS domain names. It employs an address virtualization scheme that accomplishes backwards compatibility with IPv4 applications. With certain optional exceptions, UDP encapsulation is used between elements of the Virtual Community.

Figures 6A, 6B:
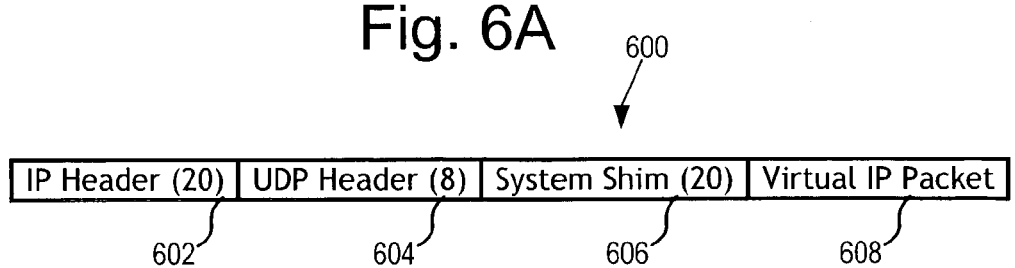
FIG. 6A depicts a packet structure for a communication packet in accordance with the present invention.
FIG. 6B is a table depicting the shim configuration of the packet in FIG. 6A.

One example of an encapsulated packet 600 is depicted in FIG. 6A. It includes a 20 octet IP header 602, an 8 octet UDP header 604, a 20 octet system shim 606, and a variable size virtual IP packet 608. A virtual IP packet has the same format as a standard IP packet.

Members of a VCN communicate to other members of that VCN by means of virtual IP Packets 608. Virtual IP addressing is used to establish unique connection identities for community connected devices. IPsec can (optionally) be applied to the Virtual IP Packet for end-to-end security. Virtual IP addresses are used to identify members in the community in the virtual packet and are not directly routable. Rather, they are unique identifiers of a given connection to the upper layer application. In one embodiment, virtual IP addresses are in IPV4 format.

In general, the UDP header is set for a default port. System shim 606 carries enough addressing information to allow the Route Directors to forward the tunneled packet through the various address realms on its way to the destination. Such a routing methodology is often referred to as source routing.

Figure 13:
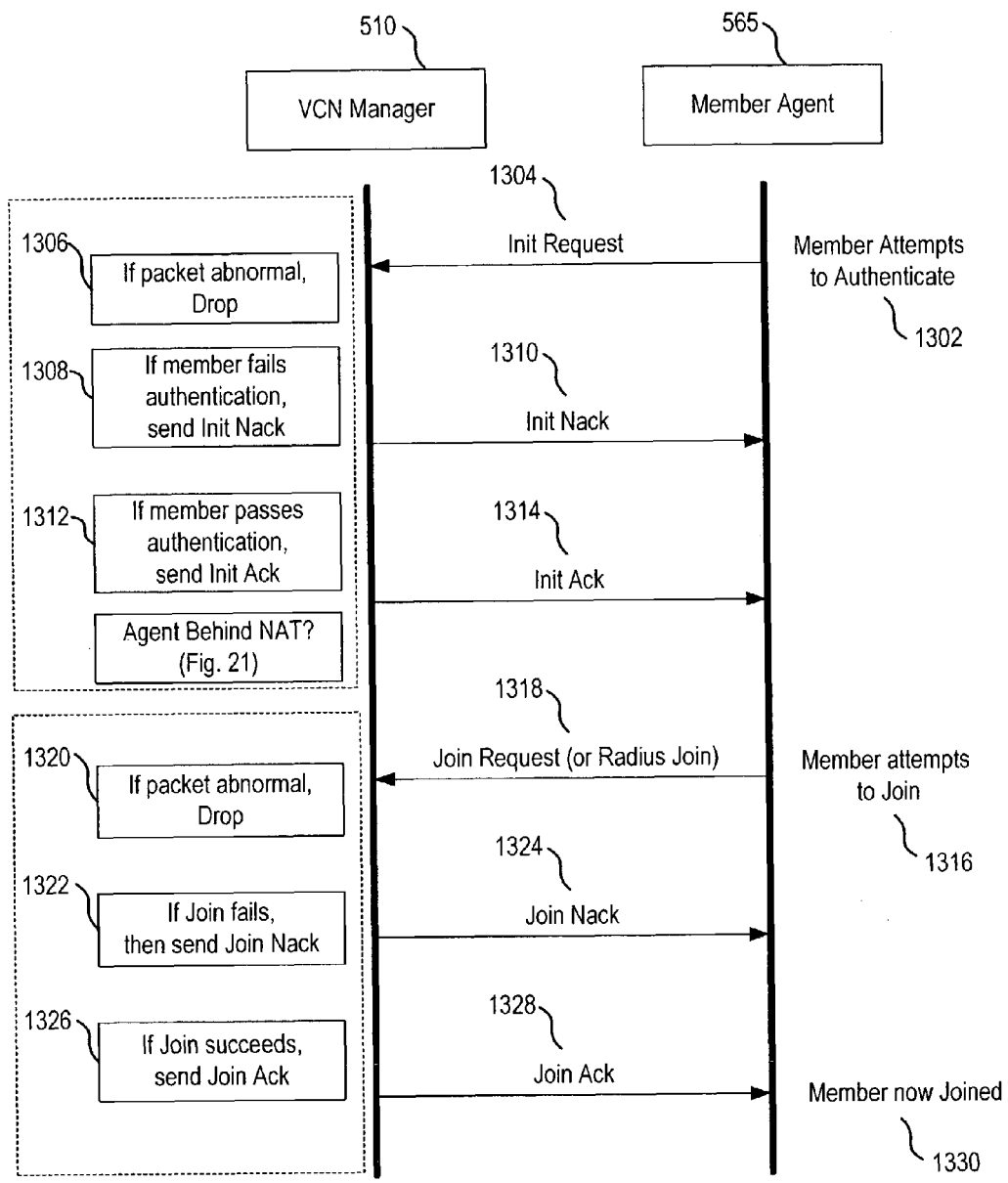
FIG. 13 is a flowchart depicting a member join process in accordance with the present invention.
Figure 21:
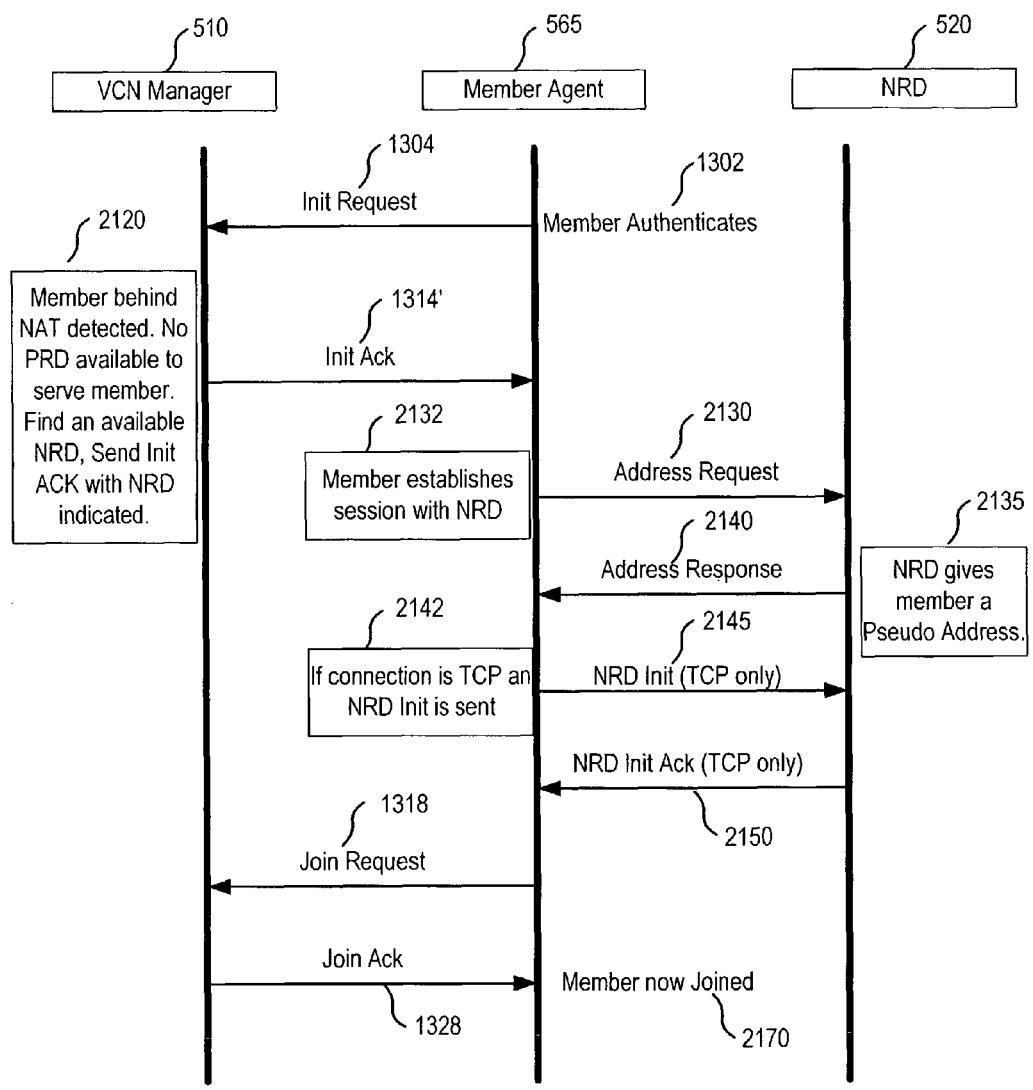
FIG. 21 depicts a flow structure for addressing and routing conducted by a Route director.

In order to route packets to a peer in a different addressing realm, the protocol stack knows the address of the appropriate Route Director that serves the peer's realm, the private address of the peer or a NAT address. The Member Agent obtains the information by using the VCN Manager as a DNS authority for DNS lookup operations as described below (FIGS. 13 and 21). The DNS response from the VCN Manager will include the above-identified information in an optional text field of the response to the Member Agent.

TCP/IP connections require IP addresses to be used as connection identifiers at the user level. If an application wishes to make a connection to "m3.abcdef.com" and another to "m4.abcdef.com", it resolves both DNS identifiers into IPv4 addresses. The system cannot assign the private IP addresses of the members to be unique connection identifiers, because two members might have the same private address in different private address realms.

Assigning a virtual address to each peer designated by a DNS string solves the problem of ambiguous endpoints. These virtual addresses may be any legal IPv4 addresses, but conflicts will occur if the same addresses are used to directly designate a peer in an IPv4 network application. For instance, if 10.0.0.10 is used as a virtual address, and is also used on a member's network as the mail server, packets that are ordinarily destined to the mail server may be redirected to a random peer. In general, when choosing virtual addresses it is best to choose addresses that will not be routable to the member. Hence, each member is assigned a virtual IP address unique in the context of the virtual community and that will not conflict with any local addresses on its LAN or any public IP addresses on the Internet.

By having each member of a VCN use a virtual address, a virtual address realm is created. The virtual address realm is the set of addresses that can be used to identify and send communications to other members of the VCN. The virtual address realm is different from a physical address realm because the physical address realm is actually used to route on a physical network. The members of a VCN will all be in the virtual address ream of that VCN, but may be in different physical address realms. For example, looking at FIGS. 5A and 5B, $M_B$ and $M_C$ are in different physical address realms (e.g. 540 and 550); however, they are both in the virtual address realm of the VCN. Another example can be seen with FIG. 4, where A and B are in different physical address realms (Cob.com and Coa.com); however, they are both in the same virtual address realm. Applications on members of a VCN will see the VCN as the local subnet; therefore, the VCN can be thought of as a virtual subnet. Each member of the VCN will appear to the application as an entity connected to the local subnet.

Route Directors 530 and 520 facilitate routing UDP encapsulated traffic to private address domains 540, 550. In general, Route Directors either have public IP addresses or addresses that are statically remapped to a public IP address. The static translation of a Route Director's IP must leave the port in the UDP header unchanged to allow the UDP encapsulated destination port number to be directly used by public members, by other Route Directors, and by private members. Route Directors 520, 530 and VCN Manager 510 may be configured to use a non-default UDP encapsulation port. In one embodiment, all outgoing messages are sent to this port on the next destination node and all incoming messages are read from this port. As discussed below, information in a "join" packet tells Member Agents the UDP encapsulation port to use in communications to Route Directors, network managers, and other members of the community.

System Shim 606 (see FIG. 6A) has a format given by way of example in FIG. 6B. Protocol Version information, data type, header option flags, and Router Information are potentially stored in the Shim. (The abbreviation "gIP" stands for "global" or public IP address, indicating an Internet routable IP address). The Data Type field indicates the meaning of the optional data that may follow the Shim. This may include a Virtual IP Packet 608, a ping to a Route Director, a request for a Network Route Director virtual address, a Route Director response with a virtual address, a member leaving and releasing a virtual address, and a member-to-Route Director packet. The shim also includes the public IP address for the source machine's Route Director, the public IP address for the destination machine's Route Director, the private IP address for the source machine and the private IP address for the destination machine. In the case where the source or destination use a public IP address, then the shim will not need to include the private addresses of the source/destination or a route director.

The system can optionally use TCP encapsulation between a member and a Route Director. If the VCN Manager determines that a Member Agent (e.g., Agent software on a member machine) and a Route Director are both able to support a TCP connection, then it may instruct the member to initiate a TCP connection with the Route Director. TCP port 80 may be used as the destination port for all TCP encapsulated messages to the Route Director, and TCP port 20202 may be used as the source port for all TCP encapsulated messages from a private member to the Route Director.

As noted above, Network Route Directors (NRDs) 520 facilitate routing traffic into and out of private address domains without requiring reconfiguration of a firewall 517 protecting the domain 550. As in UDP encapsulation, a special field in the system join packet (explained below) tells the Member Agent which TCP encapsulation port to use as the source port. The NRD will then re-encapsulate virtual-traffic in UDP-encapsulation before passing it on to other elements of the virtual network.

Note that more than one user can use the same device, with each such user having different virtual addresses in the same or different address realms. Additionally, regardless of the number of users, one device can be in multiple virtual address realms. In some embodiments, a user can have multiple identities, each in a different address realm.

FIG. 7 is a flow chart describing the overall process for communicating between members of a VCN. Any member of a VCN can communicate with any other member of a VCN regardless of whether either of the members are behind a firewall, behind a NAT device, directly accessible via the public Internet, in a private network, etc. From the point of view of an application on a member device, all the other members appear to be on the same LAN. Thus all applications running on a member's device will think that all other members of the VCN are on the same LAN and in the same address realm (e.g. the virtual address realm of the VCN).

In step 650 of FIG. 7, the Agent for the potential member joins the VCN and receives a virtual IP address. In order to establish or participate in communication within the VCN, a device must register with and join the VCN, thereby becoming a member of the VCN. The Agent will send a message to VCN Manager 510 and receive a virtual IP address back. The virtual IP address received is used to identify the member in the VCN. More details of step 650 as well as other portions of FIG. 7 will be discussed below. Note that there is a dotted line between step 650 and step 652. This dotted line signifies that a lot of time can pass between step 650 and step 652. Additionally, after step 650 is performed, it does not need to be repeated.

In step 652 of FIG. 7, an application on the source machine (the member initiating communication) intends to send a message to an application on the destination machine (another member of the VCN). Examples of applications that can communicate on the VCN include instant messaging, email, FTP, browsers, data transfer programs, and other applications that can communicate. Consider an example when application on device $M_A$ intends to initiate communication with an application on device $M_B$. Thus, $M_A$ is the source device and $M_B$ is the destination device. In step 654, the application on $M_A$ will initiate a DNS request using the domain name for $M_B$. This DNS request is sent to VCN Manager 510. In step 656, VCN Manager 510 returns the public address of the Route Director for the destination, the private address for the destination device and a virtual IP address for the destination device. In the example described above, step 656 includes returning the public IP address for private Route Director 530, the private address for $M_B$ and a virtual IP address for $M_B$. If the destination machine has a public IP address (and, thus, does not use a routing director) then step 656 will only include returning the public IP address for the destination. If the destination machine is in a private network that uses a Network Route Director (e.g., NRD 520), then step 656 will return the public IP address for the Network Route Director.

In step 658, the Agent for the source device, which received the information in step 656, will store that received information. This information can be stored in a table, or any other data structure. In step 660, the Agent for the source device will return the virtual IP address of the destination device to the application on the source device. In step 662, the application on the source device will initiate the sending of a message/data using the virtual IP address for the destination device. In step 664, a virtual IP packet will be created. The source IP address for the virtual IP packet will be the virtual IP address for the source device. The destination IP address for the virtual packet will be the virtual IP address for the destination device. The virtual IP packet will be in the same format as a standard IP packet. In step 664, the newly created virtual IP packet will be subjected to IPsec (or another security means). In some embodiments, IPsec is not used. In step 670, the virtual IP packet is encapsulated. For example, in one embodiment, the virtual IP packet is encapsulated as described above with respect to FIGS. 6A and 6B. This encapsulation will include shim 630. As described above, shim 630 will include the public IP addresses for the Route Directors for the source and destination, and the private IP addresses for the source and destination devices. If either the source or destination do not have a Route Director, the shim will not need to include that information. For example, when the source machine is $M_A$, there is no Route Director for the source. If the source machine was $M_C$, then the shim, would include the public IP address for Network Route Director 520. If the source is $M_B$, the shim would include the public IP address for Private Route Director 530.

At this point, the path of the packet will depend on whether the destination is using a Private Route Director 530, Network Route Director 520 or has a public IP address. If the destination has a public IP address, the process moves to step 678 where the encapsulated packet is forwarded to the destination agent.

If the destination is in a private network that has a PRD, then in step 672 the encapsulated packet is sent to the NAT device for the destination. For example, the encapsulated packet is sent from $M_A$ to NAT 515. In step 674, the encapsulated packet is sent from the NAT device for the LAN that includes the destination to the Route Director for the destination. For example, the encapsulated packet is sent from NAT 515 to private Route Director 530. In step 676, the Route Director which received the encapsulated packet will remove the virtual IP packet and the shim from the encapsulation. The Route Director will read the shim to learn the local IP address to send the packet to. The shim and virtual IP address will then be re-encapsulated into a new packet with the original virtual packet. The new outer packet includes a destination IP address equal to the private IP address of the destination device. The encapsulated packet received in step 674 will include a source IP address equal to the public IP address for $M_A$ (or the source's Route Director) and a destination IP address equal to the public IP address for the Route Director of the destination (e.g., PRD 530). In step 678, the new encapsulated packet will be sent from the Route Director to the Agent for the destination device.

If the destination agent is in a private network and is using a Network Route Director, then following encapsulation the encapsulated packet is sent to the Network Route Director for the destination agent in step 673. At step 675, the NRD will remove the virtual IP Packet and shim and re-encapsulate them in a UDP packet for transmission through a NAT device to the destination via a persistent UDP connection between the NRD and the destination. At step 677, the encapsulated packet is forwarded to the NAT device (via the persistent UDP connection) behind which the destination Agent resides, which will perform its own routing of the encapsulated packet to the destination Agent in step 678.

In step 680, the Agent will remove the shim and the virtual IP packet from the encapsulation. The virtual IP packet will be removed from IPsec (e.g. decrypted). In step 682, the information from the shim will be stored by the Agent. In step 684, the contents of the virtual packet will be presented to the application on the destination device. That is, the application on the destination device will receive the contents of the data payload, or at least a portion of the data payload When the destination wishes to respond to the source or the source wishes to send additional information, the process of FIG. 7 can be repeated. However, when repeating the process of FIG. 7 between two machines where communication is already established, the steps of performing the DNS request do not need to be performed again. That is, when the destination wishes to respond, the destination will perform the steps in FIG. 7 starting at step 662. The Agent for the destination device will already know all the information to put in the shim. Additionally, when the source device wishes to send additional information to the destination device, the source device can start FIG. 7 at step 662. In some embodiments, however, the steps of performing the DNS request will be performed again.

Member Agent

As noted above, devices in the VCN utilize a member agent installed on the device to communicate. One unique aspect of the system of the present invention is the integration of the agent software in a typical device.

FIG. 8 illustrates the functional flow diagram of an installed agent on a device such as a computer, server or other device. Region 810 illustrates the "user space," and region 820 represents the kernel area of the components interacting with the host device.

Applications 830 interact directly with an IP stack 835 which is built on a deterministic network extender or DNE 850. The deterministic network extender is provided by Deterministic Networks, Inc. The network extender allows one to implement any driver level functions such as IPsec, browsers, traffic redirectors, and the like, through a series of plug-ins. As shown in FIG. 8, a number of plug-ins, including a DNS plug-in 852, an IPsec plug-in 854, a virtual adapter manager 856 and a domain name router 858 (see U.S. Pat. No. 6,119,171, incorporated herein by reference) interact with the deterministic network extender 850. The DNS plug-in processes DNS queries by applications via the stack. The virtual adapter manager allows for additional adapters to co-exist in the same device.

The DNE is an NDIS compliant module (in Windows environments) which appears as a network device spire to the protocol stack 835. The DNE supports the TCP/IP and UDP protocols and various adaptor types. In essence, this forms a virtual network adaptor in device installations. This means that various configurations for each virtual community can be provided for each DNE. This provides the advantage that a number of members or users can utilize the same device, with the device installing a different virtual adaptor using plug-ins for the deterministic network enhancer and each user does not need to reconfigure the network settings of the machine to join each community. Each plug-in is constructed in accordance with standards promulgated by the DNE provider.

As shown in FIG. 8, user applications interact directly with the IP stack of the virtual adapter. Each adapter provides its own stack to the device's applications. To the applications, each stack appears separate, and no separate routing of the application is required. For example, the IKE user application 825 can interact with the domain name plug-in, the IPsec plug-in, the virtual area management communicator 856, and the security policy manager 860. The Adapter Manager 856 allows parallel stacks for each VCN to be implemented and used on each machine. This means a user and device can belong to several VCNs without needing to re-configure IP settings to access each VCN.

VCN Definition

Figure 9:
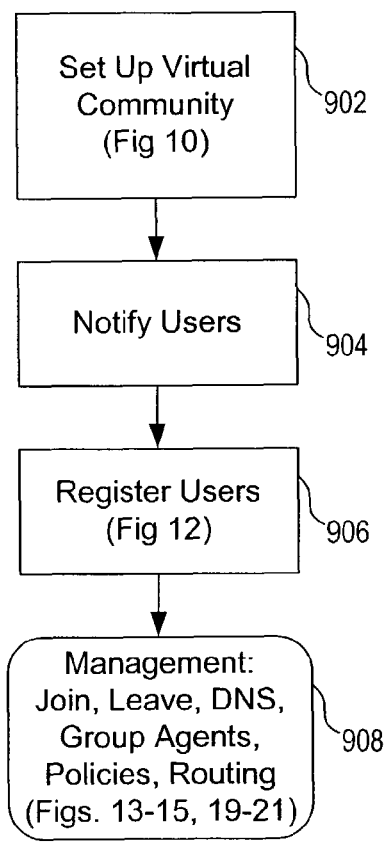
FIG. 9 is a flowchart illustrating the steps which occur in the creation of a virtual community.
Figure 10:
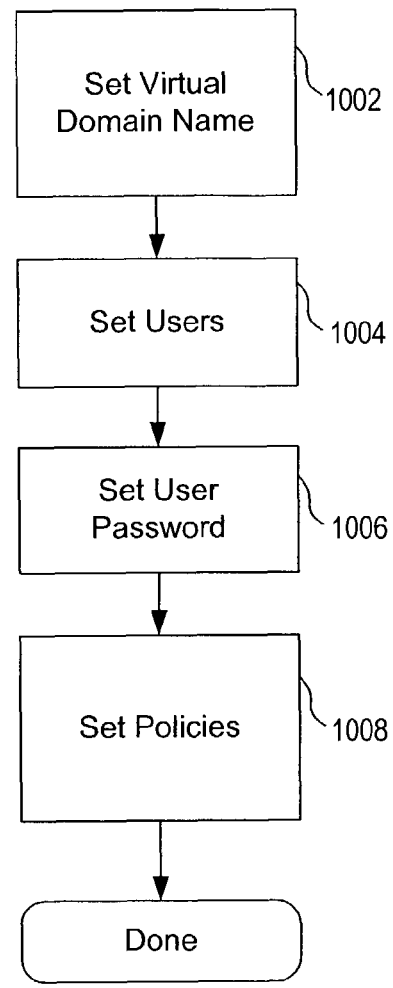
FIG. 10 is a flowchart illustrating the process of configuring a virtual community.

FIG. 9 shows the steps which occur at the VCN Manager to define and establish a virtual community. At step 902, an administrator sets up a virtual community by providing information to the VCN Manager via a user interface (not shown). It will be understood that the user interface and the method of providing information to the VCN Manager is not critical to the system of the present invention. One particularly advantageous interface is implemented in a World Wide Web browser. The interface may be implemented using HTML, XML, Java Applets, Java Server, Active Server Pager or any of a number of well-known Web technologies. The particular information required to set up the community network is illustrated in FIG. 10. Next, at step 904, users who are designated by the administrator as being allowed access to the virtual community defined in step 902 are notified by any number of appropriate means. In one implementation, the users are notified by e-mail, although other forms of notification, such as verbal or personal notification, may be used. The e-mail may contain an invitation to join the community, community authentication information, a link to a location to download the Member Agent, and/or a link to the Group Agent. Next, at step 906, using information contained in the e-mail, users register with the VCN Manager. Registration in this context means registering a machine using a Member Agent or a Group Agent with the VCN Manager. Users may be required to install the Member Agent software. The link in the notification e-mail may provide the user with a location for downloading the Member Agent software as well as instructions for installing the software. Other information, such as system password information, is provided in the e-mail. Finally, at step 908, management of the community is handled by the VCN Manager. This includes monitoring which registered users have joined and left the system, answering DNS requests, and applying security policies, as described herein. This may include notifying new users and registering those users as the definition of the VCN changes.

FIG. 10 is a flowchart illustrating the process of setting up a virtual community which is performed by an Administrator. Initially, the Administrator sets up a virtual domain name and address domain at step 1002. This information is used by the VCN Manager and Route Directors to allow members to communicate. Next, users are defined at step 1004. In one embodiment, the users are defined by providing the domain names of each of the users who will be invited to participate in the VCN. At step 1006, default passwords are set. This is the password a user first uses to access the system. The user may be forced to change the password for security reasons at a later date. Finally, at step 1008, polices may be defined at the domain level, the user level, or for individual machines in the domain. Policies are used to allow or deny access to individual machines, services, or other users.

Member Registration

The registration process is the first step that a user and machine go through with the VCN Manager before becoming a member of a virtual community. There are two phases to member registration: a registration request and a registration file request. Registration happens outside of the IPsec tunnels because at registration time no IPsec tunnel exists for the user registering.

In one implementation, all traffic between Member Agents and the VCN Manager (with the exception of Registration and Join function traffic is encapsulated using UDP encapsulation, represented by lines 511*a*, 513*a*, 523*a*, 519, 521, 527*a*, 527*c*, 537, 523*c*, 527*e*, 541, 543*a*, 533*a* of FIG. 5B). This encapsulated traffic will carry management traffic between the members and the VCN Manager. A service port is reserved at the VCN Manager in the virtual network for the establishment of a TCP connection between a member and the VCN Manager. A member that joins a VCN is informed of the service port as part of the join protocol. A DNS port is also open on the virtual side of the VCN Manager. In one embodiment, the VCN Manager virtual ports are TCP Port 9001 and DNS UDP Port 53. The packets used for the initial Registration and the subsequent Join operations use TCP port 80 outside the virtual network. This is represented in FIG. 5 by the solid lines 513*b*, 511*b*, 523*b* and 543*b*.

VCN system protocol packets that are sent outside the system tunneling are HTTP wrapped and sent to the VCN Manager on TCP port 80 to facilitate NAT traversal. More information about NAT traversal will be provided below.

Each packet includes a header and payload. For compatibility with firewalls, the HTTP wrapper makes the packet a SOAP-compatible XML document. Including a binary data portion after XML is consistent with Direct Internet Message Encapsulation (DIME), a proposed lightweight, binary message format that can be used to encapsulate one or more application-defined payloads of arbitrary type and size into a single message construct.

The format of the HTTP wrapper from the Member Agent to the VCN Manager is shown in FIG. 11. The wrapper includes an HTTP HEADER, XML HEADER and P-LENGTH fields. The HTTP header includes a POST HTTP field, an Identity field, a Content Type field, and a Content Length field. The XML header includes version information and packet type information. The Header includes error codes and explanations, as well as the content type and length.

The Registration exchange between the member agent and the VCN Manager is shown in FIG. 12A. When a Member Agent 565 attempts to register at step 1200, Member Agent 565 will send a registration request packet 1202 to the VCN Manager 510 to start registration. The packet is included in an HTTP wrapper as illustrated at 1204. The registration packet will carry the client Fully Qualified Domain Name (FQDN) and a Diffe-Hellman Key Exchange request to the VCN Manager. The packet further includes packet version information, type and length information, a user authenticator, the length of FQDN in octets, a VCN name offset, the member's FQDN in DNS format, the length of Diffe-Hellman value in octets, and the member's initial Diffe-Hellman value.

An Initial Password is passed to the user through an outside channel, such as e-mail (or other channel). In a setting where security is a concern, an alternative method such as personal communication or encrypted e-mail may be used.

The registration authenticator is computed using the first sixteen bytes of the HMAC-SHA-1 applied to the packet data with the password hash as the key. (Normally, the HMAC-SHA-1 algorithm generates a 20-byte result; in one embodiment of the system only the first (leftmost) 16 octets are used in the MAC.) The formulas are as follows:

HMAC-Key-Field=SHA-1(Initial Password)

Authenticator=HMAC-SHA-1$_{16}$(HMAC-Key-Field, Data)

The VCN Manager will respond in one of three ways 1206, 1208, 1212, to the registration packet 1202. VCN Manager 510 will acknowledge (ACK) the packet at step 1212 with the Registration Acknowledge (ACK) packet 1214 if the member belongs to a community but its status is "not registered." The VCN Manager also sends a phase-2 confirmation code to the member's e-mail address and changes the member status to "registering." The packet will transfer a "Time To Live" value to the member which is a timeout period in seconds for hearing back from the member with the confirmation code. Phase two of registration must be completed in this time period.

If the packet is abnormal (in size, FQDN length, bad type, etc.), the authenticator check fails, the member does not exist in the database, or the VCN server is not running, the VCN Manager drops the packet in step 1206. The packet will be not-acknowledged (NACK) 1210 if the member is already in the "registered" state, the send e-mail operation fails, the process of updating the member to the "registering" state fails, or the random generator fails in attempting to generate a confirmation code in step 208.

Upon receiving the Registration ACK 1214, the user will send Registration File Request Packet 1220 to the VCN Manager 510 to start registration. This packet will transfer the following information to the VCN Manager: a registration file User Authenticator, the length of FQDN in octets, a VCN name Offset, and the member's FQDN in DNS format.

The registration file user Authenticator contained in the File Request packet 1220 is slightly different from the Registration Request Authenticator in packet 1202, in that the Initial Password, passed to the user through an outside channel (e-mail for example), and the Confirmation Code, a temporary code sent in the second e-mail with a timeout to the user, are used:

HMAC-Key-Field=SHA-1(Initial Password)

User Authenticator=HMAC-SHA-116(HMAC-Key-Field,SHA-1(Confirmation Code)+Data)

The VCN Manager will send a Registration File acknowledge Packet 1230 to the member 565 in response to the Registration File Request packet 1220 in step 1228 if it is determined that the member belongs to a community. The Acknowledge Packet 1230 will transfer the following information to the member:

Crypto Type—a code indicating how the rest of the packet is encrypted. This is provided in a crypto type field preceding the registration file.

Registration File—a structure with a number of fields containing the information required by the member to successfully perform a join. It is sent encrypted using the key generated via the Diffie-Hellman key exchange.

A table representing the Registration File structure is shown in FIG. 12B. As shown therein, the Registration File contains an Authentication Type, a File Type, a File Length definition, a Token Key, a Key Timestamp, a Key Type, a Key Length, a High Availability (HA) Version, a HA Number, Server Information and Padding. The Token key is the shared secret with the server. The Token Key is identified by the Key Type, which is normally a Diffie-Hellman type in one embodiment. The VCN Manager also changes the member status to "registered."

If at step 1224, the member agent status is not set at "registering," or the timeout for phase 2 has expired, a NACK packet 1226 is sent. If the packet is abnormal (in size, FQDN length, bad type, etc.), the authenticator check fails, or the user does not exist in the database, or the VCN server is not running, the packet is dropped in step 1222. While current encrypting method for the file is to generate a key/IV pair from the combined Diffie-Hellman value using a Key Derivation Function, any number of suitable substitutes may be used.

In addition to the registration authentication described above, the system uses a packet authenticator to verify communications between the VCN Manager and Agents. The Authenticator is a cryptographically strong hash of the packet keyed by a shared secret between the source and destination. The authenticator is calculated over the entire packet using the HMAC-SHA-1 algorithm. The inputs to this Authenticator are not available until after Registration. As illustrated above, during registration an Authenticator based on the user password is used. The fields used in the calculation are a Diffie-Hellman Key comprising a multi-octet random string that is the result of the Diffie-Hellman key exchange protocol, and the entire packet data, with the Authentication field zeroed out.

The Authorization Key, AuthKey, described above, is derived from Diffie-Hellman using the KDF2 function, and used for general packet Authentication. AuthKey=KDF2 (Diffie-Hellman Key)MAC=HMAC-SHA-116(AuthKey, Data). The AuthKey need be calculated only once per registration from the KDF2 of the DH key and then stored for later use. It is known as the Authentication key and is 20 octets long.

Member Join/Leave

Once a user is registered, the user can join the VCN. Once joined, the user is a member of the VCN. Joining allows the user to let the VCN Manager and other members know that the user/member is on-line and available to communicate. The Join protocol runs between a Member Agent and the VCN Manager to establish a session key with the Manager, authenticate to the Manager, and make use of connections via the Route Directors in the community.

The Member Join process is illustrated in FIG. 13. There are two phases to the Join operation: phase one is an Initialize Request and phase two is the actual Join. At join time, the IPSec tunnel for secure communication is not established, so the first few join packets are sent outside the IPSec tunnel.

Initially, at 1302, the Member Agent 565 will send an Init Request Packet 1304 to the VCN Manager 510 to start authentication. The packet will carry the following information to the VCN Manager:

Version Variant Mask—used to indicate optional variations of the protocol from the member to the VCN;

Token Timestamp—identifying when a Token Key was created (in seconds);

Member seed—a random number to thwart so called "man-in-the-middle" attacks;

Member Local IP—the member's Local LAN IP address; and

Client FQDN—the client's fully qualified domain name.

Again, three responses 1306, 1308, 1312 are possible. At step 1306, if the packet is abnormal, it will be dropped. Similarly, if the member fails authentication, at step 1308 a NACK packet 1310 will be sent.

If the member passes authentication at 1312, the Manager will send an acknowledgement packet 1314 to Member 565. An AuthKey is also transmitted as part of the INIT Request Packet, and the Manager authenticates the packet by checking this against a secure key digest. The acknowledgement packet 1314 packet will transfer the following information to the member:

Version Variant Mask—version information;

Member Seed—from the Init Request to protect against playback attacks;

Manager Seed—a unique seed used to thwart man in the middle attacks;

Session AH Key—used in IPsec;

Session ESP Key—used in IPsec;

Ink ACK Time—a time stamp used to tie this packet to the following Join Request. There is a timeout if the Join is delayed too long;

Authentication Method—the method used for authentication;

Route Director Private IP—if member is in a private network, this is the private IP address of the Private Route Director. The value is zero if no Route Director is used;

Route Public Public IP—if member is in a private network, this is the public IP address of the Private Route Director. The value is zero if no Route Director is used;

Tunneling Port—used for UDP encapsulation Route Director Flags. Only Bits 0 and 1 currently used to direct the agent to a Private Route Director, Network Route Director with UDP, or a Network Route Director with TCP.

At step 1312 of the join process, the VCN Manager will also determine whether the Member Agent attempting to join is behind a NAT device. The method by which this occurs is discussed below with respect to FIG. 21 and the results of this determination may force the Agent to negotiate a session with a Network Route Director which will provide a pseudo address value used as the Agent's local IP value in the Join request, discussed below. This process is discussed in depth with respect to FIG. 21.

Following receipt of the acknowledgement packet, at step 1316, the member will send Join Request Packet 1318. The packet's payload includes a manager seed, the initial ACK time, join flags, the member machine's local IP address (or pseudo address), the Route Director's private IP address, the Route Director's public IP, the member AH SPI and ESP SPI, the member listen port, a token timestamp, a GUID identifying the current client run, NetBIOS name support, a password hash, version information for high availability and security policy information.

In step 1320, the VCN Manager will drop this packet if it is abnormal. In step 1322, the VCN Manager will send a NACK packet 1324 if the member is not in the registered state, the timeout for Join from INIT ACK has expired, or updating the member to the Joined state fails.

If the join action succeeds, then in step 1326 the VCN Manager will send an acknowledge packet 1328. The acknowledge packet payload includes the RMI Port at the VCN Manager, the Tunneling Port, VCN Manager Authentication Header (AH), Security Parameters Index (SPI) for IPsec, VCN Manager Encapsulating Security Payload (ESP) SPI for IPsec, the UTC Time (in seconds) when the member joined, VCN Manager Heartbeat interval (in seconds), the Member Heartbeat interval (in seconds), the VCN Manager's Virtual IP address, the Manager Subnet Prefix Length, the VCN Member Subnet Prefix Length, the Route Director's private IP address, the Route Director's public IP address, an indication of the updates that follow, an update of the Token Key, an update of the Security Policies, an update of High Availability indication, and padding. The member has now joined the community at 1330. Once the member has joined, all communications can be encrypted using IPsec.

The system of the present invention also includes RADIUS authentication support. Generally, if a member attempts to authenticate using a RADIUS server, the VCN Manager will perform the same steps as when it receives the Join Request packet except for having a RADIUS server authenticate the member. The payload for this packet is similar to the Join Request packet except that it has an additional field for RADIUS password that is used by the RADIUS server to authenticate the member.

FIG. 14 shows the sequence for leaving a VCN. Initially, at step 1410 when a Member Agent is prepared to leave the community, a Leave Request Packet 1412 will be sent to the VCN Manager 510 to start the leave process. The Leave Request Packet will carry a Leave Flag, the FQDN Length, FQDN VCN Offset and Member FQDN. Unless dropped at step 1414 or a problem exists at 1416 which would generate a NACK packet 1418, the VCN Manager will send the Leave ACK Packet 1430 to the member in step 1420. This packet has no payload. At step 1440, the member has successfully left the community.

DNS/Lookups

For one member to communicate with another member, the initiating member's agent will perform a query or DNS lookup (step 654 in FIG. 7) to determine the address of the other member, and then establish a secure communication channel between them.

The Member Agent utilizes the VCN Manager to perform lookups of other virtual members in the virtual community using DNS. The DNS operation is conducted using the DNS protocol with the VCN Manager. The member software sends a DNS query to the VCN Manager, and the manager returns information about the target member. Besides the target member's virtual IP address, the DNS response also contains additional information about the target member. While the VCN Manager accepts all DNS requests, it will only acknowledge the DNS requests of type A, which are targeted to virtual domain names in the secure virtual communities of the VCN Manager. The VCN Manager is the authoritative name server for those virtual domain names; other requests will simply be responded to with a "Server Failure."

Figure 15:
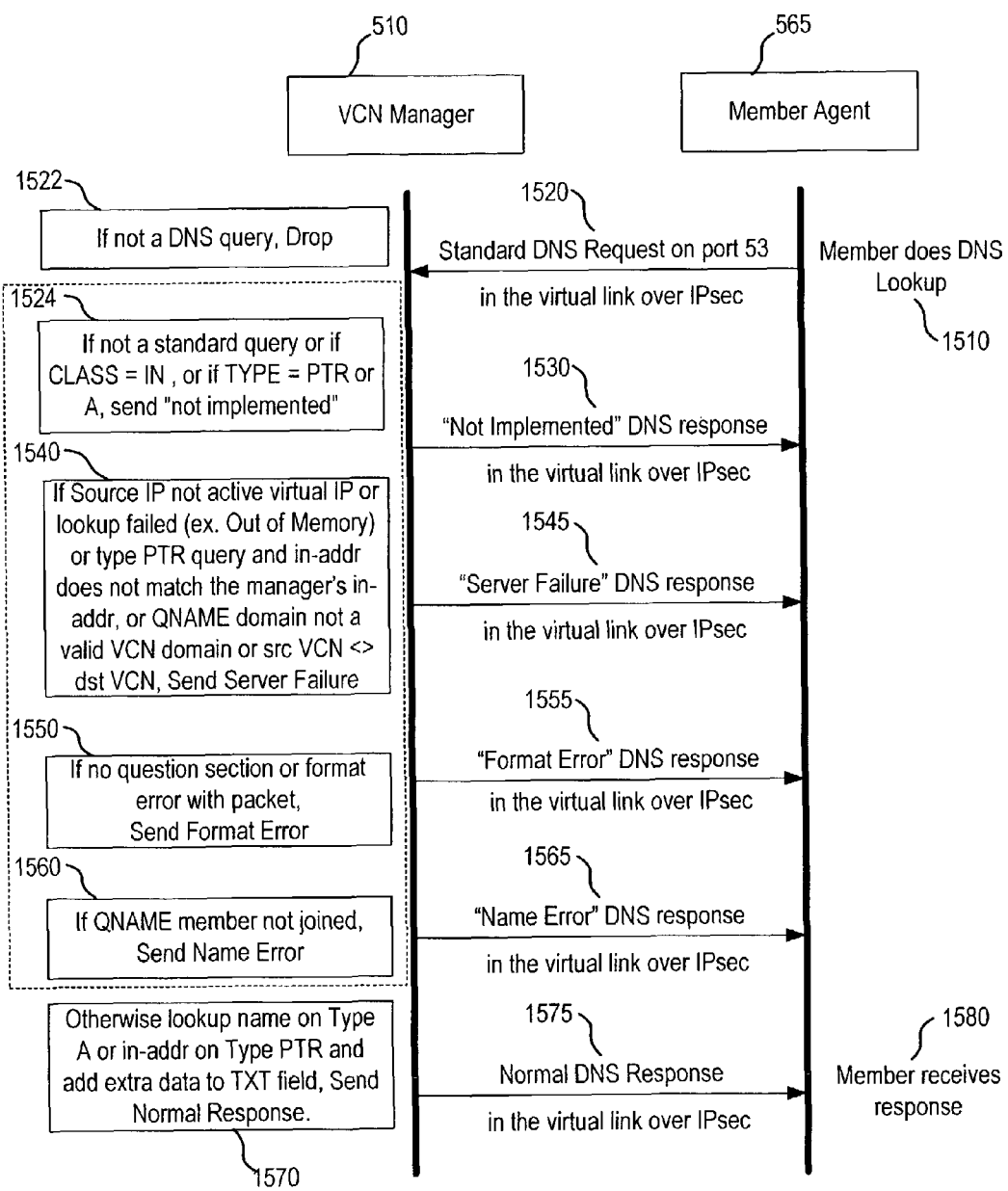
FIG. 15 is a flow diagram depicting DNS request for a member in the virtual community in accordance with the present invention.

The DNS query and response sequence is illustrated in FIG. 15. At step 1510, a member will request a DNS lookup by sending a DNS request 1520 to port 53 of the VCN Manager. The DNS request 1520 will result in a normal DNS response 1575 unless any of a number of failure conditions are met, shown at steps 1522, 1540, 1550, and 1560.

If the Manager receives a query on port 53 that is not a DNS query, then at step 1522, it is dropped. If, at step 1524, the query is not a standard query, such as a DNS STATUS (a status lookup) or IQUERY (inverse DNS), or the class of the DNS query indicates an Internet (IN) query, or if the TYPE value of the request is a pointer (PTR) or host address (A), then, a "Not implemented" DNS response 1530 is sent over the virtual link to the Member Agent 565.

At step 1540, the VCN checks to see if the source IP address is for a member of the VCN. If the source IP address is not for a member of the VCN, the virtual IP look up fails or the type PTR query does not match, a "server failed" response 1545 is returned. At step 1550, if there is no DNS Question section or there is another type of format error with the packet, a "format error" response 1555 is sent. The VCN determines whether the member has joined the VCN, at step 1560. If not, a name error response is sent at 1565.

If the name is a successful lookup (step 1570), then the VCN Manager will send a DNS Response Packet 1575 to the member 565. The response includes the following information: the target member FQDN; the target member virtual IP address; a source Route Director flag, the source member virtual IP address; the target member join time; the target member agent version; the target member private IP address; the target Route Director public IP address; the target member NetBIOS name; the shared key, shared by the two members; a target Ticket length; a target member Ticket encrypted for target member only and containing a Ticket issue time, Ticket expiration time, and shared key; the target member virtual IP address, the source member virtual IP address, the source member private IP address; the source Route Director public IP address, the source member FQDN; and padding (to obtain a multiple of 16 octets). The Ticket provided by the DNS request is detailed further in the description of FIG. 16B.

The target member's virtual IP address will be presented using an A-type resource record in the answer section of the normal DNS response packet. All the remaining information will be transferred using a TXT-type resource record in an additional section of the DNS Response.

Encapsulation

Traffic between Member Agents in the VCN is encapsulated using UDP encapsulation. Encapsulated traffic between members can carry any IP traffic from any standard IPv4 compliant application. However, one port is set aside in the virtual network at the application layer to establish a connection between two members in the community. In one embodiment, this is UDP port 500, which is set aside for Internet Key Exchange (IKE), allowing negotiation of an IPsec tunnel between the two members.

When an application on a member device wishes to open a connection to a peer on a target member device, a protocol is followed for the establishment of the IPsec session between the two. Member Agents are configured to listen on the UDP tunneling port (which defaults to port 20202) for virtual traffic. As an accepted procedure non-IPsec traffic on the virtual IKE port 500 is accepted and passed to an IKE and Security Policy Module to allow for the possibility of initiating, an IKE exchange and the establishment of an IPsec session between the two members.

IKE is fully described in RFC-2409. IKE provides a key exchange with a peer and creates a security association (SA) for the IPsec module. IKE access between peers occurs in two phases: phase 1 establishes a secure, authenticated, channel with which to communicate, and phase 2, which negotiates a Security Association on behalf of IPsec. Phase 1 is generally referred to as the ISAKMP Security Association (SA) and includes a "Main Mode" and "Aggressive Mode." In one implementation, Aggressive Mode is used for phase 1. One of the allowed phase 2 exchanges is "Quick Mode" and in one implementation, Quick Mode is used in the system for phase 2.

Figure 16A:
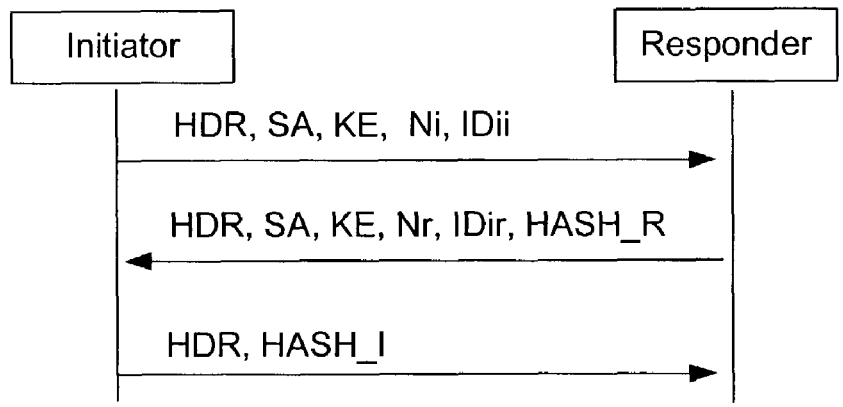
FIG. 16A depicts the commonly used IKE phase one aggressive mode exchange.
Figure 16B:
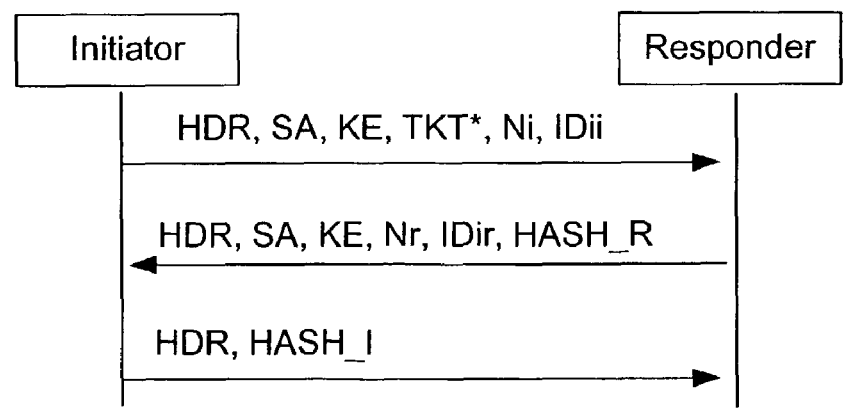
FIG. 16B depicts the IKE phase one aggressive mode exchange used in accordance with the present invention.

FIG. 16B shows the aggressive mode IKE phase one exchange utilized in the present invention. FIG. 16A shows the standard aggressive mode IKE phase one exchange for comparison. In these figures, in accordance with standard IKE parlance, one device is considered an exchange "initiator" and the other a "responder".

In general, in phase one of the IKE exchange, peers are authenticated, an IKE Security Association (SA) policy between peers is established, a Diffie-Hellman exchange is performed to produce matching shared secret keys and a secure tunnel to negotiate IKE phase two parameters is established.

In FIG. 16A, an initiator exchanges a header (HDR), SA negotiation payload, Key Exchange (KE), nonce payload (Ni, where "i" indicates an "initiator" payload) and identity of the party (IDii). The key exchange payload contains the public information exchanged in a Diffie-Hellman exchange. The responder returns the HDR, SA, KE, a responder nonce payload (Nr), its identity (IDir) and the HASH responder (HASH_R) payload, which is generally a hash of the ID payload and is used to authenticate the exchange. The initiator returns the HDR and HASH initiator (HASH_I) payload, and the initial secure tunnel is established.

In accordance with the present invention, FIG. 16B illustrates the use of an extension to aggressive mode exchange. This is performed by adding a ticket payload (TKT*) to distribute a shared-key to remote peers.

The Ticket is the means by which one Agent can identify whether another Agent is a trusted member of the virtual community. Essentially, the Ticket includes information identifying the initiating member to the receiving member.

The ticket is issued by the VCN Manager and encrypted for the receiving member with a member-server shared secret; only the receiving member can open it. The ticket contains a time-stamp, a sequence number and a shared-secret used for IPSEC between the two members. To communicate with the receiving member, the initiating member obtains the ticket from the VCN Manager (through, for example, the DNS sequence, described above) and passes it to the receiving member in a payload that can ride on an IKE packet. The receiving member receives the Ticket, decrypts the Ticket using the member-server shared secret, and uses the information in the Ticket to establish secure communication with the initiating member.

Figure 17:
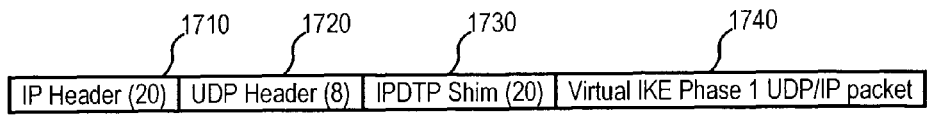
FIG. 17 depicts a packet structure of the virtual IKE phase 1 packet.
Figure 18:
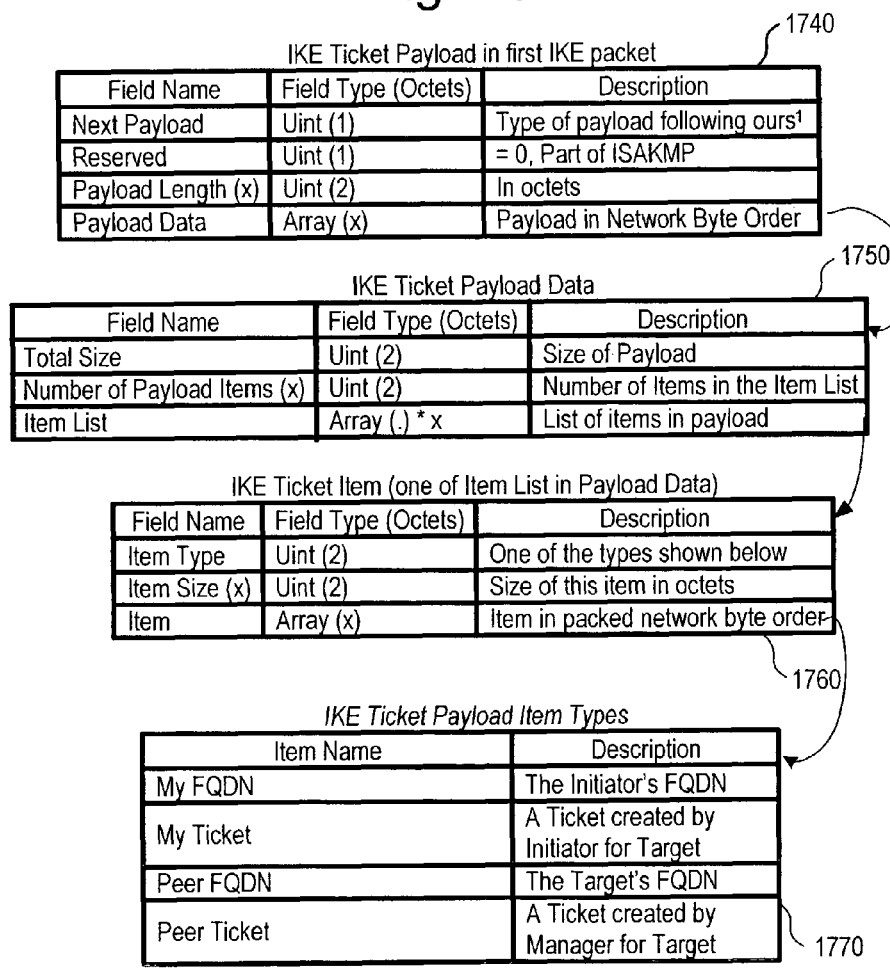
FIG. 18 depicts the IKE ticket payload data structure.

This payload, TKT, is formatted as shown in FIG. 17. The packet 1700 contains an IP header 1710, UDP header 1720, System shim 1730, and Virtual IKE Phase 1 UDP/IP packet 1740. FIG. 18 illustrates the structure and data of an exemplary first packet 1740. The IKE Ticket Payload in the first IKE packet contains information on the payload and the payload data, including the type of payload following next and the ticket payload data 1756. The payload data 1750 includes the size, number and item list 1766. The item list 1760 includes type, size and item information. The IKE ticket payload data 1740 contains the item types The item types 1770 are shown in the last table of FIG. 18: "My FQDN"—a null terminated FQDN in label dot format. (For example, a human readable FQDN "bob.system.com" is encoded as "bob.system.com\0x00.") My Ticket data which includes a Manager Current Time (UTC of Manager as known by initiator); and an Initiator Virtual IP (Obtained at Join time) Target Virtual IP (Obtained from Manager) and Padding. The Peer FQDN Format is a null terminated FQDN in label dot format. For example, a human readable FQDN "bob.system.com" is encoded as "bob.system.com\0x00". Finally, the Peer Ticket data includes: a Ticket Issue Time (UTC (seconds) on VCN Manager); a Ticket Expiration (UTC (seconds) for ticket expiration); a Shared Key used by the two Members for IKE; a Target Virtual IP Address; the Initiator NAT Port; the Initiator Subnet; the Initiator Virtual IP Address; Initiator Private IP Address, the Initiator Public IP Address, the Initiator FQDN and padding.

The Diffie-Hellman key exchange protocol is utilized in the Internet Key Exchange (IKE) protocol that precedes IPsec. The prime and generator value are taken from a well-known Internet Draft entitled, "More Diffie-Hellman groups for IKE," Kivinen et al., IP Security Protocol Working Group (IPSE) Internal Draft, Dec. 13, 2001, for proposed use within the Internet Key Exchange (IKE) protocol.

Administrative Functions

The system can simulate pings to any of the Route Directors (NRD or PRD). This ping is sent inside a packet generated from an application used to trouble-shoot the virtual network by touching the Route Directors and insuring that they are alive.

Figure 19:
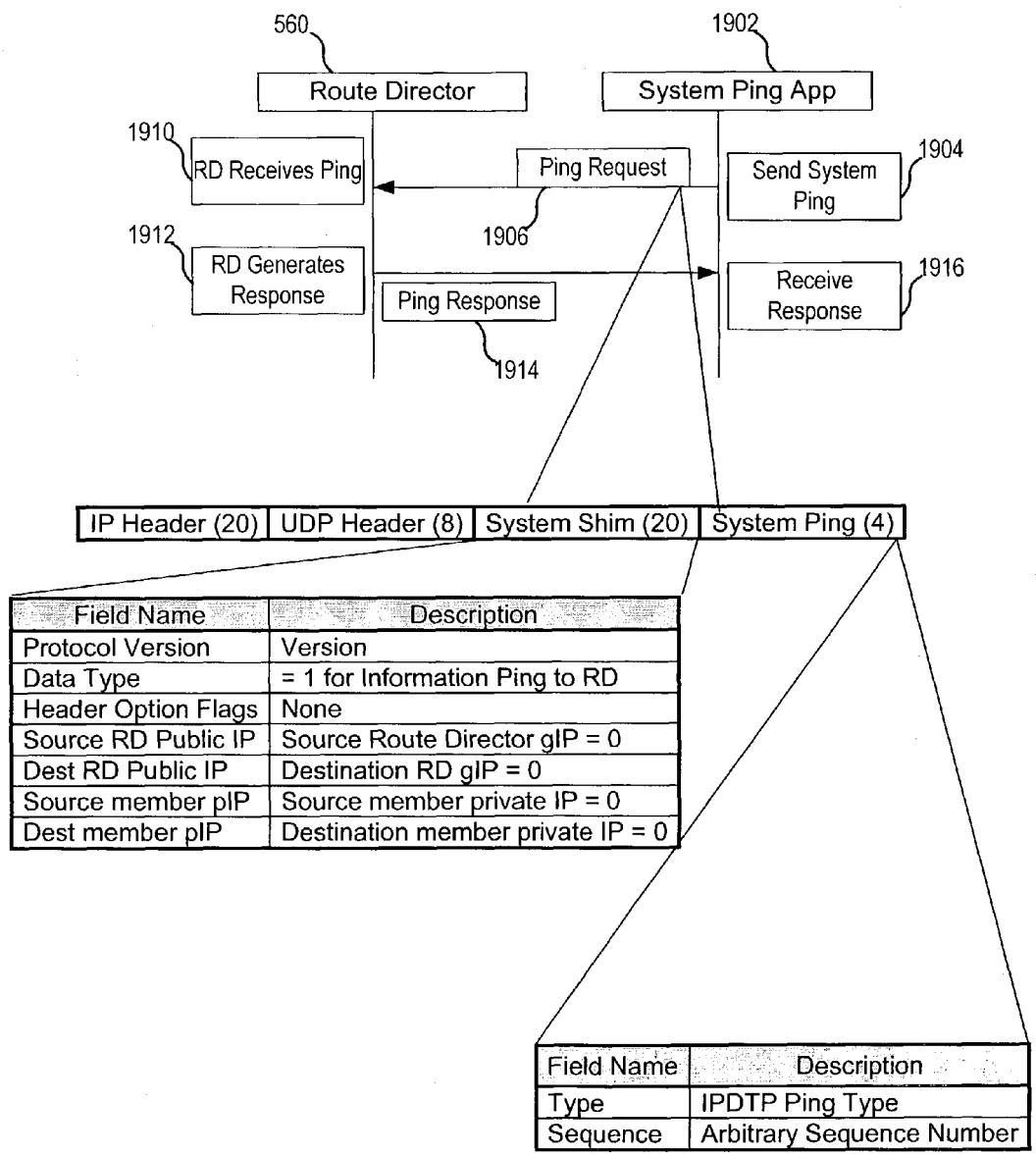
FIG. 19 is a representation of a system ping sequence in accordance with the present invention.

An exemplary ping process is illustrated in FIG. 19. As shown therein a pinging application 1902 at step 1904 sends a ping request packet 1906 to the Route Director 560. The Route Director receives the ping at 1910 and generates a response at step 1912. The ping response packet 1914 is returned to the application 902 at step 1916.

The ping request packet is sent and returned on the default tunneling UDP port (which in FIG. 5B is UDP Port 20202). The Ping Request 1906 packet is formatted as shown in FIG. 19, with the content of the shim and the ping packets exploded in further detail. In the shim 1930, the source and destination Route Director public IP addresses (gIP) and private IP addresses (pIP) are all set to 0. In the system ping field 1960, the ping type field may be a ping request or a ping response. The Sequence field in the response is set to the same value as the Sequence field in the request packet.

Another function which may be performed is an Agent Query. FIG. 20 illustrates a query request from a Member Agent requiring system/status information of another member. The first Member Agent 565 at step 1802 will send a Query Request Packet 1810 to the VCN Manager 510. The Packet contains definitions for the Maximum Number of Records to return, a status Mask indicating whether the members are registered and/or joined, a platform Mask, indicating the platform (desktop, server, laptop, mail server, etc) of the member, the FQDN Length, FQDN VCN Offset, Search String Length, Member FQDN and a Search String for pattern matching. This packet is sent over the IPsec tunnel between the VCN Manager and the Member Agent.

If the packet is abnormal it is dropped at step 2012 if there is an error in the query authentication file or the member is not joined, NACK 2016 is sent in step 2014. If the packet is not abnormal, no error is present, the member passes authentication and was joined, then the VCN Manager sends a query acknowledgement Packet 2030 to the member. The packet payload includes a number of records with the following fields: the status of the member, the platform type of the member, and the member's FQDN String. Note that the FQDN is null-terminated and consistent with the FQDN in DNS format definitions. Here, a human readable FQDN "www.abcdefg.com" is encoded as "www.abcdefg.com\0x00".

Each joined member will periodically send a heartbeat packet to the VCN Manager so that the VCN Manager can determine if the member is alive. In addition, the member's heartbeat packet is used to determine how long the member is actually joined. This information can be used to allow a provider of the infrastructure for the system to generate revenue from users on a per-use time basis. Conversely, the VCN Manager periodically sends its heartbeat packet to joined members so that the joined members can know if the Manager is alive. This can be used by the member to determine if it should switch to a backup VCN Manager. Heartbeat packets are sent inside the system tunnel on the default tunneling port (UDP port 20202) and are IPsec protected.

Route Directors

Route directors allow communication to a member that is in a private network. The PRD resides within a private network, behind the NAT device. The NRD resides on the public side of the NAT device. The NAT device can be a Network Address Port Translation (NAPT) NAT device or a basic NAT where only addresses are translated.

Note that devices with public addresses do not require Route Directors (RDs). In the context of FIG. 5B, devices $M_A$ and $M_E$ do not require either a PRD or NRD, since they reside in the public address space. Likewise, $M_X$ does not require the PRD for its domain 540, since it has a public address (or is statically mapped to a public address at the NAT device 515).

The NRD implements a NAT traversal architecture which allows System packets to enter and exit a private network. The NRD maintains persistent connections/sessions with members that are behind NAT devices. Member Agents initiate a TCP or UDP persistent connection/session with the NRD and use keep-alive messages to ensure that the NAT device does not drop the member's connection/session. The use of TCP or UDP is based on a bit set by the VCN Manager in the INIT ACK packet of the Join Protocol. Communication to a member uses NRD tunnels between the NRD and the Member Agent through the persistent connection/session. More information about a suitable NAT traversal architecture is found in U.S. Pat. No. 7,139,828 and U.S. patent application Ser. No. 10/233,288, "Communicating With An Entity Inside a Private Network Using an Existing Connection to Initiate Communication," both of which are incorporated herein by reference.

When a member behind NAT attempts to join a virtual network by contacting the VCN Manager as discussed above, the VCN Manager will detect the presence of the NAT device, direct the member to a specific NRD and indicate the use of TCP or UDP. The presence of the NAT device must be detected during the initialize Init message portion of the join sequence so the VCN Manager can inform the member that it needs to setup a session with the assigned NRD prior to the Join message sequence.

In one embodiment, the NRD uses a pseudo address. The pseudo address is different than the virtual address and is used solely for NRD routing. The pseudo address assigned by the NRD will allow the NRD to map a packet to the member's post-NAT IP address and UDP port.

The process for establishing a session with a NRD and obtaining an address therefrom is shown in FIG. 21. Initially (as described in FIG. 13), a member behind a firewall will send an init request 1304 to VCN Manager 510. In addition to the functions performed with respect to step 1306, 1308, and 1311 (of FIG. 13), the VCN Manager will detect that the member is behind a NAT device and whether it is served by a PRD in step 2120.

The detection of a NAT device is accomplished using a field with the member's local IP address in the Init packet sent to the VCN Manager. The VCN Manager detects the fact that Agent 565 is behind a NAT device by comparing the member's private IP address in the INIT message payload with the source address in the TCP/IP headers. If the addresses differ, then a NAT device is present. At step 2120, the VCN Manager must next check if the member's NAT device is associated with a known PRD (Premises Route Director). If no PRD is found, then the VCN Manager will check if the member can use a known NRD. If an NRD is found then the INIT ACK 1314' will indicate that the member must establish a session with the NRD prior to joining the VCN. If the NRD can support TCP tunneling, the INIT ACK will also indicate to the member to start a TCP connection rather than a UDP connection. If neither a PRD nor an NRD is found for the private member, an Init NACK will be returned. The VCN Manager will find an available NRD and send an INIT ACK 1314' with the NRD info data contained therein. The contents of an INIT ACK packet 1314 are discussed above with respect to FIG. 13.

At step 2132, the member will seek to establish a session with the NRD and will send address request 2130 to the NRD. The member sends the Address Request Packet 2130 to the NRD. The packet includes an IP Header, UDP Header or TCP header, and Shim. In this case, the shim includes the NRD's public address. At step 2135, the NRD assigns the member a pseudo address. This is used as the member's private address in the Shim when external members send packets to the NRD for forwarding to the private member. The NRD will store the association of the pseudo address with the Member's NAT device public address and port number. When other members of the VCN perform a DNS request on the member behind the NRD, as part of the DNS response, they will receive the public address of the NRD and they will receive the pseudo address as the private address for the member behind the NRD. When sending a communication to the member behind the NRD, the outer packet will be addressed to the public address of the NRD. The NRD will access the shim to identify the pseudo address. The NRD uses the pseudo address as a handle to the persistent connection/session when sending packets through a NAT to the member. Once identifying the appropriate persistent connection/session, the shim and virtual packet are encapsulated and sent to the destination, via the NAT device, using the identified persistent connection/session. When the NAT device receives the message, it will do the address and port translation, and forward the message to the member agent's real local address and port on the private network.

In one aspect, the pseudo address comprises portions of the public IP address space in IP version 4 that had been reserved for special purposes. This ensures that no machine within a private realm will have the same pseudo IP address as the private address of a machine in any separate and distinct private realm. In order to prevent this from happening, the system of the present invention uses addresses that are otherwise not used or reserved. Examples include the 0.0.0.0, the 10.0.0.0, 14.0.0.0, 127.0.0.0, 169.2454.0.0, 172.16.0.0 and the like.

The NRD provides the pseudo address to the Agent 565 in a NAT Traversal Address Response Packet 2140. The packet includes a shim having an indicator that the response is a pseudo address response, as well as the source Route Director public IP address and Destination Route Director public IP address, (which is set equal to the NRD address), the Source member private IP address (0) and the Destination member private IP address, which is the Virtual IP. Hence all communications for the Member Agent will be routed to the NRD 520. After acquiring the pseudo address from the NRD, the member designates that pseudo address to the VCN Manager as its local address in Join packet 1318.

Note that there is an extra packet exchange 2145, 2150 when establishing a TCP connection that is not required when establishing a UDP connection with the NRD. This packet is the NRD Init Request Packet 2145. The previous TCP session for the Address Request and Address Response must be closed and a new TCP session opened which will remain open for the duration of the tunnel session. The member sends the Init Request message to the NRD as the first message in this TCP session. This message only has a TCP header and System Shim preamble, and has no data following the Shim.

After receiving the pseudo address, the join process completes with the join request packet 1318, and join ack packets 1328. After the join processing is complete, TCP/UDP encapsulated traffic flows between the member and the NRD through the NAT. The member is now ready to establish connections with other members.

When outbound System traffic from a member behind a NAT device to the NRD is not frequent enough to keep the NAT device's mappings active, the member may to send keep alive messages to the NRD's TCP port 80 or UDP encapsulation port to ensure that the NAT device does not drop the TCP/UDP encapsulation session. The member sends this message to the NRD to ensure that the NAT device does not drop the TCP/UDP port mapping. The keep-alive messages do not need to be sent when other messages were sent out during the keep-alive interval.

The member sends this NAT Traversal Leave Packet message to the NRD to release the session and pseudo address when the member is leaving the VCN. The NAT traversal switch will verify that the receive-from socket address this message came from matches the lookup table entry before deleting the member's address.

Group Agent

For some devices, member client software cannot be installed on the device or it is not desirable to install member client software on the device. For example, a printer or other networked devices may not be able to load software. For various reasons, some entities may not desire to add network software onto their machines. Additionally, some devices may use operating systems that do not support running the member agent software. For those devices that cannot or choose not to use member agent software, a Group Agent can be used. The Group Agent acts as a proxy for one or more members of a VCN without requiring installation of member agent software on the client devices. Thus, a device can become a member of a VCN without changing any of the software on the device by using the Group Agent.

Figure 22:
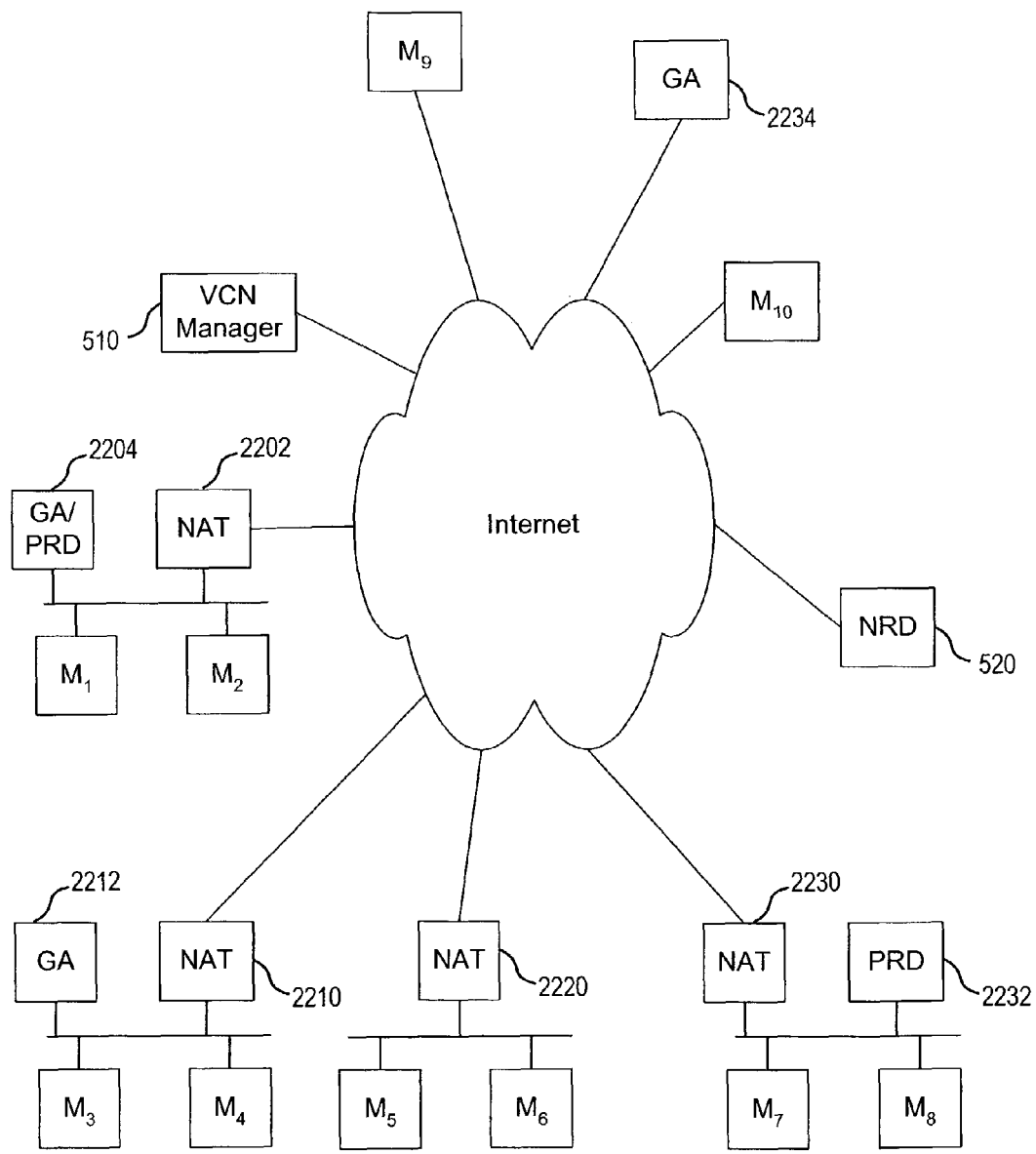
FIG. 22 is a block diagram depicting one embodiment of various components of the present invention utilizing a Group Agent.

FIG. 22 is a block diagram depicting various components of the present invention utilizing a Group Agent. Note that some of the members of a VCN can use a Group Agent while other members do not use a Group Agent. FIG. 22 shows ten devices $M_1$-$M_{10}$. Devices $M_1$, $M_2$, $M_3$, $M_4$ and $M_{10}$ are devices that are participating in the VCN without using member agent software. Rather, they will use a Group Agent. Devices $M_5$, $M_6$, $M_7$, $M_8$ and $M_9$ are devices which include member agent software and, therefore, do not need to use a Group Agent. FIG. 22 shows some of the many varieties of permutations of using Group Agents, Network Route Directors and Private Route Directors. Other permutations can also be used with the present invention. Also note that FIG. 22 is more of a structural view of additional components of the present invention, as compared to FIG. 5B which is more of a symbolic/logical view.

FIG. 22 includes a first private network which connects to the Internet (or other network) via NAT device 2202. In addition to NAT 2202, the private network includes device $M_1$, device $M_2$ and Group Agent 2204. In one embodiment, the Group Agent runs on the same machine as a Private Route Director. Devices $M_1$ and $M_2$ do not include agent software. Rather, they participate in the VCN using Group Agent 2204.

A second private network allows devices to communicate to the Internet (or other network) via NAT device 2210. That private network also includes Group Agent 2212, device $M_3$ and device $M_4$. Note that Group Agent 2212 does not include a Private Route Director. Thus, for devices $M_3$ and $M_4$ to be reached by other members of the VCN, communication is performed via Network Route Director 520. In one embodiment, each of the private networks are different physical address realms. That is each uses a different set of private IP addresses. The present invention will also work if the private networks have overlapping addresses. That is, one or more private IP addresses are used by more than one private network involved in a VCN.

A third private network, which includes devices $M_5$ and $M_6$, provides for communication on the Internet via NAT device 2220. A fourth private network, which includes devices $M_7$ and $M_8$, allows its components to communicate on the Internet (or other network) via NAT device 2230. This fourth private network includes Private Route Director 2232. Because devices $M_7$ and $M_8$ include member agent software, there is no need for a Group Agent on this network. Device $M_9$ has a public IP address and includes member agent software; therefore, it communicates and participates in the VCN as described above. Device $M_{10}$ has a public IP address; however, device $M_{10}$ does not include member agent software. For device $M_{10}$ to participate in the VCN, it must make use of Group Agent 2234, which has a public IP address.

In one embodiment, a Group Agent includes software running on a computing device, including (but not limited to) a server, router, personal computer, minicomputer, mainframe, mobile computing device, or other suitable computing device. In other embodiments, the Group Agent, or any other of the software components described above, can be performed by its special purpose computing device.

A Group Agent acts as a proxy for one or more members which do not have member agent software. For example, Group Agent 2204 is a proxy for devices $M_1$ and $M_2$; and Group Agent 2212 is a proxy for devices $M_3$ and $M_4$. Group Agent 2234 is a proxy for device $M_{10}$. Although FIG. 22 shows the Group Agents being proxies for one or two members, a Group Agent can be a proxy for more than two members.

Communication between two members of a VCN can pass through two NAT devices, one NAT device for each member. For example, communication between device $M_1$ and device $M_4$ will pass through NAT device 2202 and NAT device 2210. Additionally, communication between device $M_1$ and another entity in a private network configured like the private network of device $M_1$ will require communication to pass through two NAT devices.

Note that a single Group Agent can participate in more than one VCN. For example, Group Agent 2204 can be used to allow device $M_1$ participate in a first VCN and concurrently (for all or part of the time) allow device $M_2$ to participate in a second VCN. Because there can be multiple virtual community networks, the VCN Manager is able to create and maintain, the multiple virtual community networks. As described herein, the VCN Manager identifies which entities can communicate on each VCN by maintaining a list of domain names for each VCN. For example, one list may include the domain names for devices $M_1$-$M_{10}$.

The Group Agent requires initialization so it may know which members it is a proxy for. Group Agent initialization cannot occur until after the Group Agent has joined the VCN Manager as a member. The join prior to Group Agent initialization is for a pseudo-member so the proxy initialization messages can use virtual IP addresses and the tunneling protocols described above to travel on an IPsec tunnel between VCN Manager 510 and the particular Group Agent. Separate member specific tunnels will be created when the Group Agent later joins for the proxied members. The Group Agent join will require the Group Agent to be registered with the VCN Manager. In one embodiment, this registration will be done during the installation of the Group Agent.

Figure 23:
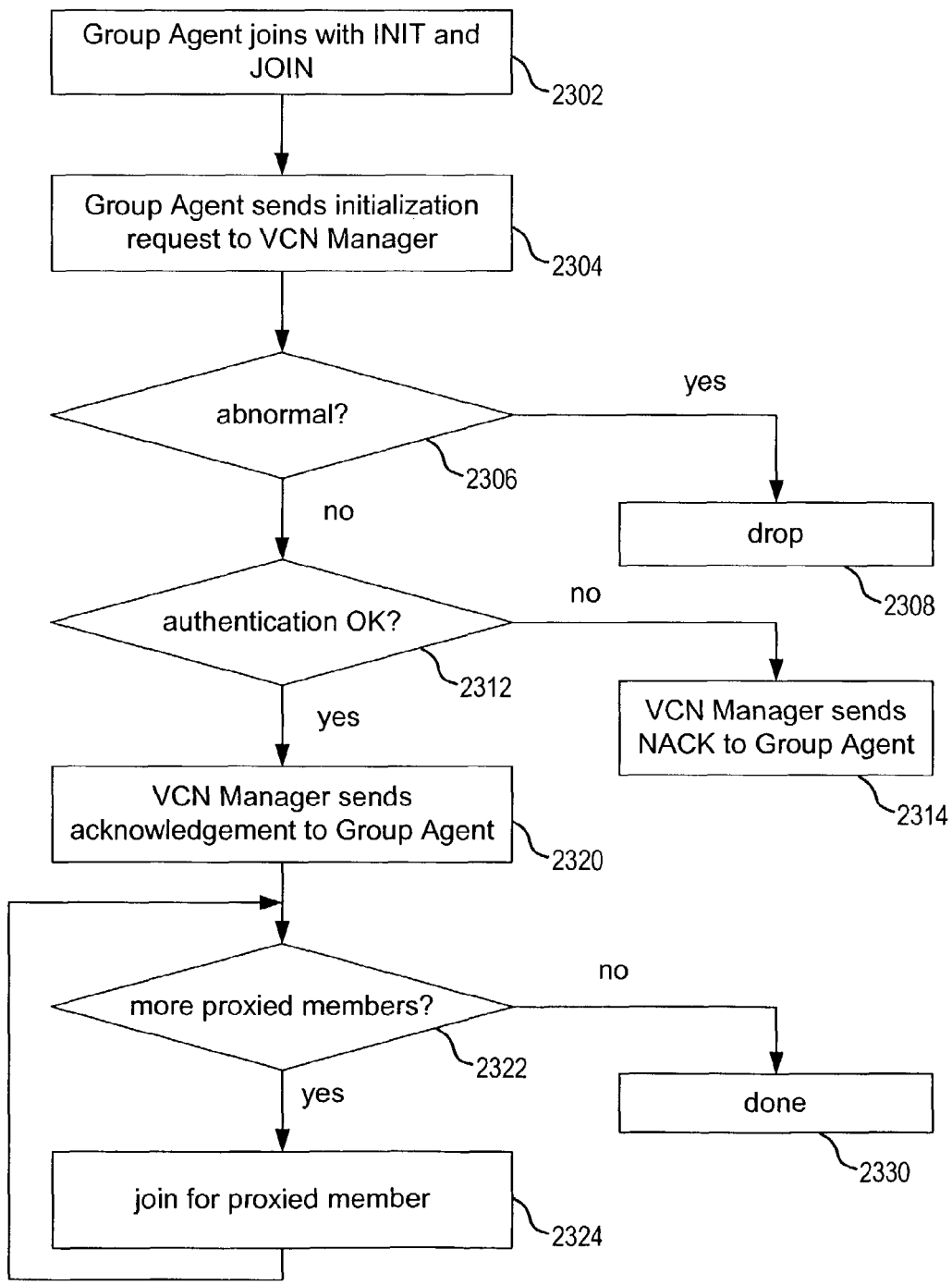
FIG. 23 is a flow chart describing one embodiment of the process for Group Agent initialization.

FIG. 23 provides a flowchart describing one embodiment of the process for Group Agent initialization. In step 2302, the Group Agent joins as a pseudo-member. This process of step 2302 is performed as described above. In step 2304, the Group Agent will send an initialization request to the VCN Manager. The initialization request is a packet that includes the fully qualified domain name for the Group Agent, a packet version indication, a packet type indicating that it is an initialization request, a packet length, and an authentication code. If the received initialization request is abnormal (step 2306), then the initialization request is dropped in step 2308. If the packet was normal but authentication failed (step 2312), then the VCN Manager sends a NACK to the Group Agent in step 2314. If authentication was successful and the initialization request was normal, then the VCN Manager sends an acknowledgement to the Group Agent in step 2320.

After completion of step 2320, the Group Agent is initialized and now must join each of the members it is proxying. To do so, the Group Agent will perform a loop where each iteration will include joining for one of the members that is being proxied. In step 2322, it is determined whether there are any more members being proxied that have to be joined. If there are more members to join, then the Group Agent will join for one member being proxied in step 2324 and the method will loop back to step 2322. When there are no more proxied members to be joined, the process of FIG. 23 is complete (step 2330). The process of joining for a proxy member is the same as the process of joining described above; however, the process is performed for the member by the Group Agent rather than by the member agent. The virtual IP address received by the Group Agent is for the member being proxied. The Group Agent stores that virtual IP address in a data structure for the member. In one embodiment, there is a separate data structure for each member being proxied. In another embodiment, there is one data structure which has separate records for each member being proxied. This data stored will include the member's virtual IP address and private address in the local LAN, as well as other information that will be described below.

The acknowledgement sent from the VCN Manager to the Group Agent in step 2320 contains all of the member information required so the Group Agent can send the appropriate join requests for each member being proxied. The following information is in the acknowledgement sent from the VCN Manager to the Group Agent: packet version indicating the version of the header, packet type indicating that it is a acknowledgement, packet length, authentication code, subnet IP address, subnet prefix, public IP address of the Private Route Director (when the Group Agent also includes a Private Route Director), Private Route Director ping flag (1 if PRD responds to pings), the number of members being proxied, the number of permanent connections from proxied members to other members that the proxy must make, the member record list and the connect record list. The member record list is a set of records for each member being proxied. The following information is stored in each record: member password (password SHA1 digest), member's local private IP address, the length of the member's fully qualified domain name, the member's fully qualified domain name, offset to the VCN name, authentication type (0=preshared 1=certificate), time stamp indicating when the token key was created, token length in bytes, token key (member shared secret with VCN Manager), HA version number, number of HA records, HA record list and authentication key (generated by server for the proxy). Each HA record in the HA record list includes a VCN Manager IP address for the next VCN Manager, a join port for the next VCN Manager and a service port for the next VCN Manager in case the current VCN Manager goes down. The connect record list includes the following three fields: proxy member index (zero based index into member list), DNS request length and a DNS request.

Once the Group Agent joins for all of its members, then any of its members can receive communication from other members of the VCN or can initiate communication to other members in the VCN. Members that are being proxied by a Group Agent can communicate with other members being proxied by the Group Agent, with other members proxied by a different Group Agent (regardless of whether they are in a private network or available on the public Internet), and members that do not use a Group Agent (regardless of whether those other members are in a private network or available on the Internet with a public IP address), as long as they are all members of the same VCN. From the point of view of an application on a member being proxied by the Group Agent, the VCN appears as a local subnet (or LAN) and all of the members of the VCN appear to be on the local subnet (or LAN). However, the VCN is not a local subnet (or LAN); rather it is a virtual subnet (or LAN). Each of the members of the VCN will have a Virtual IP Address on the virtual subnet.

Because members of a VCN register with the VCN Manager, the VCN Manager will know how to find the members (e.g. it will know its public and private addresses). Thus, a Group Agent acting as a proxy for a first member will be able to act as an intermediary for that first member when talking to a second member of a VCN even if the second member moves to a different or new private network and/or changes its IP address. That is, when the second member makes the move or change, the second member will so inform the VCN Manager. The VCN Manager will inform the Group Agent of the change so that the Group Agent can continue to act as an intermediary between the first member and the group member. More information about communicating with mobile entities can be found in U.S. Pat. No. 7,139,828; U.S. patent application Ser. No. 10/161,573, "Creating A Public Identity For An Entity On A Network," filed on Jun. 3, 2002; and U.S. patent application Ser. No. 10/233,288, "Communicating With An Entity Inside A Private Network Using An Existing Connection To Initiate Communication," filed on Aug. 30, 2002, all three applications are incorporated herein by reference in their entirety.

Figure 24:
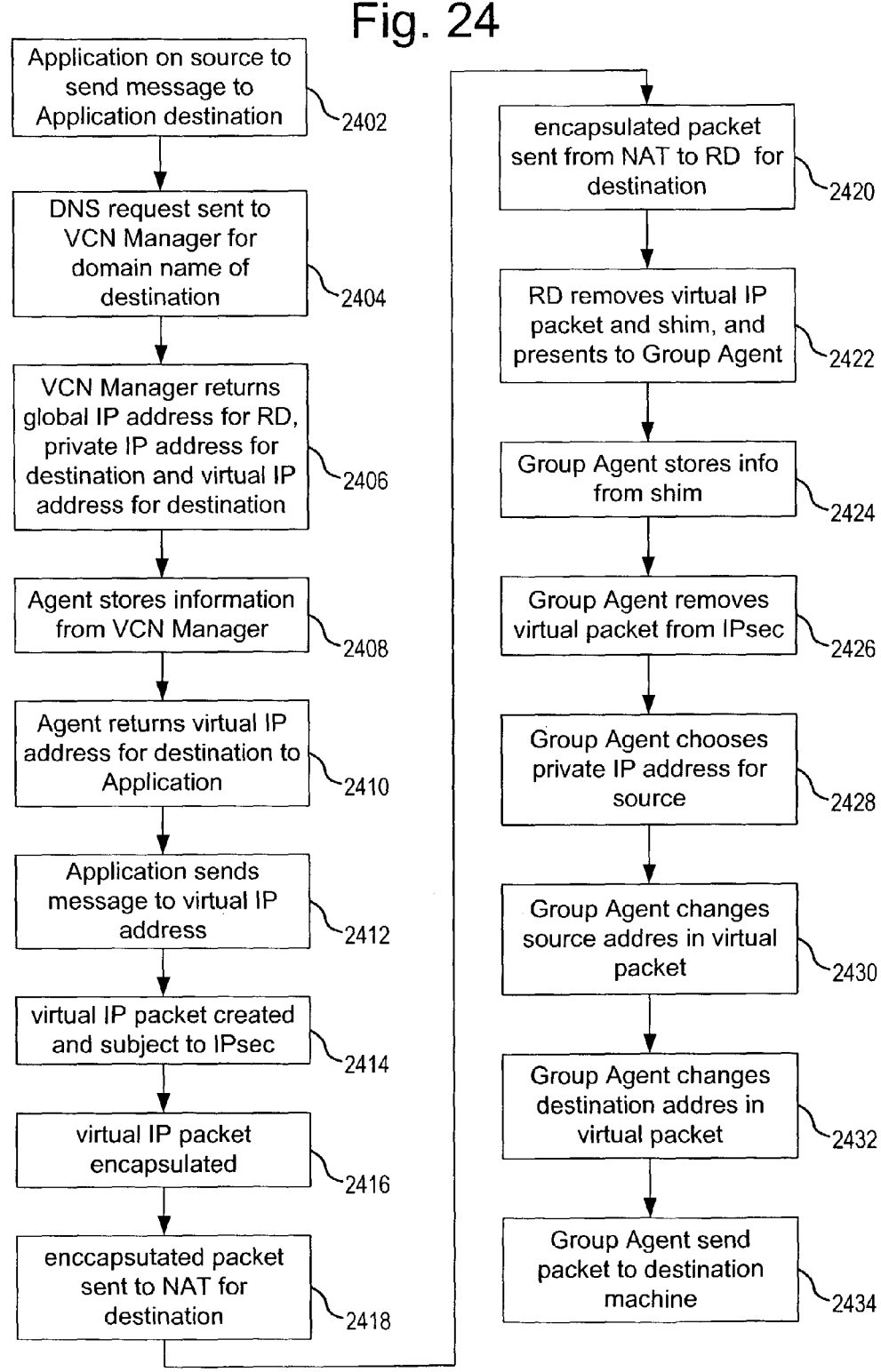
FIG. 24 is a flow chart describing one embodiment of a process for initiating communication with a member that is using a Group Agent.

FIG. 24 is a flowchart describing one embodiment of a process for initiating communication with a member that is being proxied by a Group Agent. In FIG. 24, the communication is being initiated by a member that is not being proxied by a Group Agent. That is, the member initiating communication is a member that has agent software loaded on it. That member is initiating communication with a member that does not have agent software. Prior to the process of FIG. 24 being performed, the Group Agent has joined the member into the VCN and the member initiating communication has already joined the VCN. For example purposes, looking at FIG. 22, the process of FIG. 24 can be performed by $M_5$, $M_6$, $M_7$, $M_8$ or $M_9$ initiating communication with any of devices $M_1$, $M_2$, $M_3$, $M_4$ or $M_{10}$. Assume, for example purposes, that device $M_9$ is initiating communication with device $M_1$. The destination device is also assumed to be served by a Private Route Director.

In step 2402, an application on the source device (e.g., device $M_9$) is intending to send a message to an application on the destination device (e.g., device $M_1$). In step 2404, the application on the source device sends a DNS request to the VCN Manager using the domain name of the destination. For example, the application on $M_9$ will send a DNS request using the domain name for $M_1$. In step 2406, the VCN Manager returns a response to the DNS request. This response includes the public IP address for private Route Director 2204, the private IP address for member $M_1$ and the virtual IP address for member $M_1$. In some embodiments, the DNS response also includes a token key (as described above). The Agent on the source device (e.g., $M_9$) stores the information it received from the VCN Manager. In step 2410, the Agent on the source device returns the virtual IP address for the destination to the application which initiated the DNS request. In step 2412, the application on the source device initiates the sending of a message to $M_1$ using the virtual IP address. That is, a virtual IP packet is created where the source address is the virtual IP address for the source machine ($M_9$) and the destination address in the virtual IP packet is the virtual IP address for the destination device (device $M_1$). The virtual IP packet is created in step 2414 and subject to IPsec (or other security means). In step 2416, the virtual IP packet is encapsulated. Encapsulation includes adding a shim, a UDP header and an IP header, all as described above. The shim includes the public IP address for the Private Route Director associated with the destination member (e.g., PRD 2204) and the private IP address for destination (e.g. member $M_1$). If the source, the member initiating communication was in a private network, then the shim would also include the public IP address for the Route Director associated with the source and the private IP address for the source. In step 2418, the encapsulated packet is sent to the NAT for the destination's private network. That is, in the example above, the newly created packet is sent to NAT 2202 via the Internet (or other network). In step 2420, the encapsulated packet is sent from the NAT (e.g., NAT 2202) to the Route Director for the destination (e.g., PRD 2204).

In step 2422 of FIG. 24, the Route Director removes the virtual IP packet and the shim from the encapsulation and presents both the virtual IP address and the shim to the Group Agent (e.g., Group Agent 2204). The Group Agent stores the information from the shim, as described above with respect to the member agent software. In one embodiment, the Group Agent includes the necessary logic to received the communication so that no route director is necessary. In step 2426, the Group Agent extracts the virtual IP packet from IPsec. In step 2428, the Group Agent chooses a private IP address for the source entity. In the above example, the source entity is device $M_9$. Group Agent 2204 will pick a private IP address that is routable in the private network associated with device $M_1$ and NAT 2202. This private address will be used by device $M_1$ to identify $M_9$. In step 2430, the Group Agent will change the source address in the virtual packet. That is, the virtual packet originally had a source address equal to the virtual IP address for the source device (e.g., $M_g$) and a destination address equal to the virtual IP address for the destination device (e.g., $M_1$). In step 2430, the source address in the virtual IP packet is changed to be equal to the private IP address chosen by the Group Agent for $M_9$ in step 2428. In step 2432, the Group Agent changes the destination address in the virtual IP packet to be equal to the private IP address in the local LAN for $M_1$. In step 2434, the packet is sent by the Group Agent to the destination machine (e.g., sent to $M_1$).

The above discussion of FIG. 24 was made with respect to the example that the communication has been initiated by device $M_9$ which is a member having a public IP address and member agent software. The process of FIG. 24 can also be performed by a member which does not have a public IP address, including members using a Private Route Director and/or a Network Route Director. When the process of FIG. 24 is being performed by members using Route Directors, the shim that is added to the encapsulated packet in step 2416 includes the private IP address for the member and the public IP address for the Route Director. The example used in discussing FIG. 24 also assumes that the destination was a device in a private network where the private network included a Group Agent and a Private Route Director. The process of FIG. 24 can also be adapted to work with a member using a Group Agent where the member has a public IP address and/or a member in a private network that uses a Network Route Director.

When sending communication to an entity with a public IP address that uses a Group Agent, the shim will include the public IP address for the Group Agent and the public IP address for the member in step 2416. The packet will not be sent to a NAT or to a Route Director. Rather, the packet will be sent directly to the Group Agent. The Group Agent will access the virtual IP packet in step 2426. Rather than choosing a private IP address to identify the source, the Group Agent will choose a public IP address for the destination to use to refer to the source. The virtual IP packet will be changed so that the source address is equal to the public IP address chosen by the Group Agent to represent the source and the destination address will become the public IP address for the destination. The virtual IP packet (which is no longer virtual) will be sent to the destination.

If the destination member participates in a VCN using a Network Route Director (e.g., device $M_3$ using NRD 520), then the encapsulated packet is sent to the Network Route Director in step 2418. The Network Route Director will communicate the shim and virtual IP packet to the Group Agent (e.g., Group Agent 2212) via a persistent connection as described above in FIG. 7, steps 673-675, 677, except that the packet is forwarded to the Group Agent rather than the NAT device. The Group Agent will then perform steps 2424-2434, as described above.

FIG. 25 is a flowchart describing one embodiment of a process for the destination device responding to the initiation of communication from the source device. In the example discussed above, this process would include device $M_1$ responding to device $M_9$. In step 2502, the application on device $M_1$ attempts to send a communication. A packet is then created using the private addresses. The packet would include a source address equal to the private IP address in the LAN for device $M_1$. The destination address would be equal to the private IP address in the LAN that is used to identify device $M_9$. That packet is sent to the Group Agent in step 2504. In step 2506, the Group Agent changes the packet by replacing the private addresses with virtual addresses. The source address is replaced with the virtual IP address in the VCN used to identify device $M_1$. The destination address in the packet is replaced with the virtual IP address in the VCN used to identify device $M_9$. In step 2508, this packet is subject to IPsec, and encapsulated as described above.

In step 2512 of FIG. 25, the Group Agent sends the packet. In the example above, the Group Agent would send the encapsulated packet to device $M_9$ using the public IP address for device $M_9$. If the Group Agent is sending the packet to a member that is in a private network, then the encapsulated packet would be sent to the Group Agent/Private Route Director for the member or to the Network Route Director for that member. If the responding device (e.g. $M_1$) is using a Network Route Director, then the Group Agent can still send the reply packet directly to the original source without going through the Network Route Director. If the replying device (e.g. $M_1$) has a public IP address, then the packet sent to the Group Agent would include the public IP addresses for the responding device and the public IP address that the Group Agent told the replying device to use to identify the original source device. In one embodiment, when the member using the Group Agent has a public IP address, an IPsec tunnel can be created between the Group Agent and the member device.

FIG. 24 contemplates communication being initiated by a device that has member software loaded on it. FIG. 26, on the other hand, describes a process that is performed when communication is initiated by a device that does not have member software and, therefore, uses Group Agent software. In step 2602, the application on the initiating member will send a DNS request. This DNS request will be sent to the Group Agent. The Group Agent receives the DNS request in step 2604. In step 2606, the Group Agent sends its own DNS request for the same domain name to the VCN Manager. In step 2608, the Group Agent receives a response from the VCN Manager. This response will include the virtual IP address for the target, the public IP address of the Route Director for the target (if any) and the private IP address for the target (if any). If the target has a public IP address, then the public IP address will be returned. In step 2610, the Group Agent will choose a private IP address in the local LAN to be used to identify the target. The virtual IP address returned from the DNS request will be mapped to this private IP address in the local LAN. In step 2612, the Group Agent will return that chosen private IP address to the application as a response to the application's DNS response. In step 2614, the application will initiate the communication. In one embodiment, the process of 2614 includes performing the steps of FIG. 25. Note that if the member who is initiating the communication in the process of FIG. 26 has a public IP address, rather than being in a private network, then in step 2610 the Group Agent will map the virtual IP address to a public IP address that the Group Agent and member will use to identify the target. It is this mapped public IP address that is returned to the application in response to the DNS request. The mapped public IP address is routable to the Group Agent.

Although the Group Agent is described above with respect to use with a VCN, the technology of the Group Agent is broader than a VCN. Thus, the Group Agent can be used to allow entities to participate in other types of networks, communities, groups, organizations, communications, etc.

Note that in one embodiment, the member being serviced by the Group Agent must be in the same physical address realm as the Group Agent. In this manner, the Group Agent is used to bridge that physical address realm with the virtual space. The Group Agent contains the functionality to allow the member to participate in the virtual community; however, all the protocols of the virtual community terminate at the Group Agent. This way, the member receives a normal IP packet. From the point of view of the member, the Group Agent works like a router which connects the member to the subnet of virtual nodes.

The foregoing detailed description of the invention has been presented for purposes of illustration and description. It is not intended to be exhaustive or to limit the invention to the precise form disclosed. Many modifications and variations are possible in light of the above teaching. For example, any number of VCN Managers may be used. Any combination of NRDs and PRDs may be used to improve network efficiency. Any combination of Member Agents and Group Agents may be used, and the Virtual Community may be of any size. Additionally, while the above description provided an example using the protocols and addressing currently used on the Internet, the present invention can be used with other protocols and addressing schemes. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A virtual network system, comprising:
a virtual network manager implemented with a first device memory and a first device processor of a first computing device, the virtual network manager configured to register devices in a virtual network that is defined by a domain name, each device in the virtual network being identified to the other devices by a virtual network address that is unique for each device and not directly routable via a public network, the virtual network manager further configured to distribute a virtual network address to a device when the device is registered in the virtual network;
a route director implemented with a second device memory and a second device processor of a second computing device, the route director configured to communicate data between the devices that are registered in the virtual network, the data being communicated as encapsulated packets from a source device to a destination device, an encapsulated packet including a first virtual network address that corresponds to the source device and a second virtual network address that corresponds to the destination device; and
the virtual network manager further configured to receive a DNS request from the source device, and return a public network address of the route director, a private network address for the destination device, and the second virtual network address that corresponds to the destination device.

2. The system of claim 1 wherein each of the devices communicate with the virtual network manager and the other devices in the virtual network via an associated agent.

3. The system of claim 2 wherein the associated agent is installed on a proxy device which is a proxy agent for one or more of the devices in the virtual network with respect to the virtual network manager and the route director.

4. The system of claim 2 wherein the virtual network manager is further configured to:
receive a request from the agent associated with a device in a private network to register the device in the virtual network; and
detect a presence of a NAT device via which the request is routed from the agent to the virtual network manager.

5. The system of claim 4 wherein the virtual network manager is further configured to receive the request from the agent as a message, and detect the presence of the NAT device by comparing a field in a payload of the message with a source address in a header of the message.

6. The system of claim 1 wherein each of the devices include an agent configured to communicate with the virtual network manager and agents of the other devices in the virtual network.

7. The system of claim 1 wherein the virtual network manager is coupled to the public network and has an associated public network address.

8. The system of claim 1 wherein the route director is further configured to receive the encapsulated packets when routed to a public network address corresponding to the route director.

9. The system of claim 1 wherein each of the devices in the virtual network are further identified by at least one physical network address.

10. The system of claim 9 wherein the physical network addresses that are associated with the devices in the virtual network are dynamic.

11. The system of claim 9 wherein the physical network addresses that are associated with the devices in the virtual network are static.

12. The system of claim 9 wherein the physical network addresses that are associated with the devices in the virtual network are private network addresses, and wherein the virtual network addresses are unique in the virtual network so as not to conflict with the private network addresses.

13. The system of claim 9 wherein the source device is coupled to a first private network and accesses a public network via a first NAT device configured to transmit the encapsulated packets, an encapsulated packet further including the physical network address of the source device as a private network address in the first private network.

14. The system of claim 13 wherein the physical network address of the source device is dynamic.

15. The system of claim 13 wherein the physical network address of the source device is static.

16. The system of claim 13 wherein the destination device is coupled to a second private network and accesses the public network via a second NAT device, the encapsulated packet further including the physical network address of the destination device as a private network address in the second private network.

17. The system of claim 16 wherein the physical network address of the destination device is dynamic.

18. The system of claim 16 wherein the physical network address of the destination device is static.

19. The system of claim 16 wherein said first private network and said second private network share at least one network address.

20. The system of claim 1 wherein the route director is further configured to:
provide a device-specific pseudo address assignment for the device in the virtual network when the device communicates with the route director via a NAT device; and
store an association of the device-specific pseudo address with a public network address of the NAT device and a port number of the NAT device.

21. The system of claim 1 wherein the route director includes a translator for virtual network address information for a device in the virtual network that is implemented in a private network.

22. The system of claim 1 wherein the virtual network manager is coupled to the public network and includes a public network address.

23. The system of claim 22 wherein the route director is coupled to the public network and includes a different public network address than the public network address of the virtual network manager.

24. The system of claim 22 wherein the route director is coupled to a private network and includes a private network address.

25. The system of claim 1 wherein the encapsulated packets further include virtual IP packets configured for communication of the data, the virtual IP packets being encrypted prior to being encapsulated.

26. The system of claim 25 wherein the virtual IP packets are encrypted using IPSEC.

27. The system of claim 25 wherein the virtual IP packets are encrypted using DES or triple DES.

28. The system of claim 1 wherein the virtual network manager includes a virtual community definition that is defined by the domain name, and includes one or more of the devices that are registered in the virtual network.

29. The system of claim 1 wherein the route director is a public route director in the public network, the system further comprising a private route director in a private network configured to enable access to devices of the private network that are also in the virtual network from devices of the public network that are also in the virtual network.

30. A virtual network manager, comprising:
a network interface configured for data communication via a virtual network that is defined by a domain name having an associated public network address;
a memory and a processor to implement a register module configured to register devices in a virtual network, the register module further configured to:
receive a registration request from an agent associated with a device;
distribute a virtual network address to the device when the device is registered in the virtual network, the device being identified to other devices in the virtual network by the virtual network address; and
a DNS server for the virtual network, the DNS server configured to receive a DNS request from a first device in the virtual network, and return a network address associated with a network route director, a private network address associated with a second device in the virtual network, and a virtual network address associated with the second device.

31. The virtual network manager of claim 30 further comprising an additional network interface configured for data communication via a public network.

32. The virtual network manager of claim 31 wherein the network interface is a UDP port configured for data communication via the virtual network, and wherein the additional network interface is a TCP port configured for registration communications via the public network.

33. The virtual network manager of claim 30 wherein the network interface is a UDP port configured for data communication via the virtual network.

34. The virtual network manager of claim 30 wherein the register module is further configured to receive the registration request from the agent that is installed on the device for data communication via the virtual network.

35. The virtual network manager of claim 30 further comprising a join module configured to receive a join request from the agent associated with the device to indicate that the device is connected for data communication within the virtual network, the join module further configured to receive a leave request from the agent associated with the device to indicate that the device will be disconnected from data communication within the virtual network.

36. The virtual network manager of claim 35 wherein the join module is further configured to provide virtual network addresses to the devices that are registered in the virtual network.

37. The virtual network manager of claim 35 wherein the join module is further configured to maintain data to associate a virtual network address with a device in the virtual network.

38. A virtual network system, comprising:
 a computing device that includes at least a memory and a processor configured to implement a network manager of a virtual network that is defined by a public domain name, the network manager configured to distribute virtual network addresses to devices that register as members in the virtual network, each device in the virtual network being identified to the other devices by a virtual network address associated with the device;
 a first virtual network agent associated with a first device that is registered as a member in the virtual network;
 at least a second virtual network agent associated with at least a second device that is registered as a member in the virtual network;
 a route director configured to route communications between the first device and the at least second device in the virtual network via the respective first and second virtual network agents, the communications configured for routing as encapsulated packets that include a first virtual network address that is not directly routable corresponding to the first device and a second virtual network address that is not directly routable corresponding to the at least second device; and
 the network manager includes a DNS server configured to provide authoritative responses for DNS queries in the virtual network, the DNS server further configured to receive a DNS query from the first device and return a network address of the route director, a network address of the second device, and the virtual network address of the second device.

39. The system of claim 38 wherein the route director is a public network route director that includes a public network interface and the network address is a public network address by which the first and second virtual network agents communicate with the public network route director.

40. The system of claim 38 wherein the route director is a private route director that includes a private physical network interface and the network address is a private physical network address.

41. The system of claim 38 wherein the first virtual network agent is installed on the first device for data communication via the virtual network.

42. The system of claim 41 wherein the first device is in a private physical network, has an associated private network address, and has the associated virtual network address that is not directly routable by which the first device can be identified by the at least second virtual network agent from outside of the private physical network.

43. The system of claim 41 wherein the first device is coupled to a public physical network, has an associated public network address, and has the associated virtual network address by which the first device can be identified by the at least second virtual network agent.

44. The system of claim 38 wherein the first virtual network agent is a proxy agent for the first device with respect to the network manager and the route director.

45. The system of claim 38 wherein the first and second devices are configured to access the virtual network from separate private address physical realms.

46. The system of claim 38 wherein the network manager includes at least a first community definition and a second community definition, the first community definition being defined by the public domain name and includes one or more of the devices that are registered in the virtual network, and the second community definition being defined by a different public domain name and includes one or more different devices that are registered in the virtual network.

47. The system of claim 38 wherein the network manager includes a member authenticator configured to authenticate the devices that request to register with the network manager.

48. A computer-implemented method, comprising:
 receiving registration requests from devices that request to be registered as members of a virtual network that is defined by a domain name having an associated public network address in a public network, each of the devices having an associated private network address;
 distributing a virtual network address to a device to register the device as a member in the virtual network, each device in the virtual network being identified to the other devices by the virtual network address that is associated with the device;
 routing communications between the devices that are registered in the virtual network, the communications being routed as encapsulated packets from a source device to a destination device, an encapsulated packet including a first virtual network address that corresponds to the source device and a second virtual network address that corresponds to the destination device; and
 transmitting a response to a DNS request received from one of the devices that are the members in the virtual network, the response to the DNS request including a public network address of a route director that registers the devices, a public network address of the destination device, and the second virtual network address that corresponds to the destination device.

49. The method of claim 48 further comprising providing the devices in the virtual network with a communication agent.

50. The method of claim 49 wherein said providing the devices in the virtual network with a communication agent includes providing a proxy agent.

51. The method of claim 48 further comprising authenticating the devices as the members in the virtual network.

52. The method of claim 48 further comprising defining a member set of the virtual network that includes one or more of the devices, and assigning the domain name that defines the virtual network.

53. The method of claim 48 further comprising defining at least two member sets of the virtual network that each include one or more of the devices, the at least two member sets having at least one different device.

54. The method of claim 48 further comprising assigning the virtual network address to the device as an IPV4 compliant address.

55. The method of claim 54 wherein the IPV4 compliant address is non-routable.

56. The method of claim 48 further comprising routing network traffic via the public network from a first device having a public network address to a second device having a different public network address, the network traffic being routed as data packets having a source address which is the virtual network address of the first device and a destination address which is the virtual network address of the second device, the data packets being encapsulated to include a second source address which is a public network address of the first device and a second destination address which is the different public network address of the second device.

57. The method of claim 48 further comprising routing network traffic from a first device in a private physical network having a private network address to a second device having a public network address, the network traffic being routed as data packets having a source address which is the virtual network address of the first device, a destination address which is the virtual network address of the second device, and a shim which includes the private network address, the data packets being encapsulated to include a second destination address which is the public network address of the second device.

58. The method of claim 48 further comprising routing network traffic from a first device in a private physical network having a first private network address to a second device in a different private physical network having a second private network address, the network traffic being routed as encapsulated packets having a source address which is the virtual network address of the first device, a destination address which is the virtual network address of the second device, and a shim which includes the first and second private network addresses.

59. The method of claim 58 wherein the first private network address and the second private network address are identical.

60. The method of claim 48 further comprising:
receiving a join status request from a first device in the virtual network as a query to determine the status of a second device in the virtual network; and
responding to the join status request to indicate whether or not the second device is joined to the virtual network for data communication.

61. The method of claim 48 further comprising applying a group policy to the devices that are registered as the members of the virtual network.

62. One or more processor readable storage media devices comprising processor readable code that, if executed by a computer device, implements a virtual network manager to:
receive registration requests from devices that request to be registered as members of a virtual network that is defined by a domain name having an associated public network address in a public network, each of the devices having an associated private network address;
distribute a virtual network address to a device to register the device as a member in the virtual network, each device in the virtual network being identified to the other devices by the virtual network address that is associated with the device;
manage communications routed between the devices that are registered in the virtual network, the communications routed as encapsulated packets from a source device to a destination device, an encapsulated packet including a first virtual network address that corresponds to the source device and a second virtual network address that corresponds to the destination device; and
transmit a response to a DNS request received from one of the devices that are the members in the virtual network, the response to the DNS request including a public network address of the virtual network manager, a public network address of the destination device, and the second virtual network address that corresponds to the destination device.

63. One or more processor readable storage media devices as recited in claim 62 further comprising processor readable code that, if executed, implements the virtual network manager to provide the devices in the virtual network with a communication agent.

64. One or more processor readable storage media devices as recited in claim 63 wherein the virtual network manager provides the as a proxy agent.

65. One or more processor readable storage media devices as recited in claim 62 further comprising processor readable code that, if executed, implements the virtual network manager to define a member set of the virtual network that includes one or more of the devices, and the domain name that defines the virtual network.

66. One or more processor readable storage media devices as recited in claim 62 wherein the virtual network address includes a non-routable IPV4 compliant address.

67. One or more processor readable storage media devices as recited in claim 62 further comprising processor readable code that, if executed, implements the virtual network manager to route network traffic via the public network from a first device having a public network address to a second device having a different public network address.

68. One or more processor readable storage media devices as recited in claim 62 further comprising processor readable code that, if executed, implements the virtual network manager to route network traffic from a first device in a private physical network having a private network address to a second device having a public network address.

69. One or more processor readable storage media devices as recited in claim 62 further comprising processor readable code that, if executed, implements the virtual network manager to route network traffic from a first device in a private physical network having a first private network address to a second device in a different private physical network having a second private network address.

70. One or more processor readable storage media devices as recited in claim 69 wherein the network traffic is routed to the first or second device via a NAT device.

71. One or more processor readable storage media devices as recited in claim 69 wherein the first private network address and the second private network address are identical.

72. One or more processor readable storage media devices as recited in claim 67 wherein the network traffic is routed as encapsulated data packets.

73. One or more processor readable storage media devices as recited in claim 67 wherein the network traffic is routed as encrypted data traffic.

74. One or more processor readable storage media devices as recited in claim 62 further comprising processor readable code that, if executed, implements the virtual network manager to apply a group policy to the devices that are registered as the members of the virtual network.

75. A virtual network system, comprising:
a computing device that includes at least a memory and a processor configured to implement a virtual network manager having a network interface coupled to a virtual network, the virtual network manager including at least one virtual community definition that is defined by a domain name having an associated public network address and a user set of one or more devices that are registered in the virtual network, each device in the virtual network being identified to the other devices by a virtual network address that is associated with the device, the virtual network manager configured to exchange virtual network information with the one or more devices of the user set, the virtual network being accessible by devices in the user set and devices outside of the user set, and the virtual network manager further configured to receive a DNS request from a source device, and return a public network address of a route director, a private network address for a destination device, and a virtual network address that corresponds to the destination device.

76. The system of claim 75 wherein the virtual network manager includes a member register module.

77. The system of claim 75 wherein the virtual network manager includes a member join module.

78. The system of claim 77 wherein the member join module provides a virtual network address to a device that is registered as a member of the network.

79. The system of claim 75 wherein the virtual network manager is further configured to maintain data on an association between at least one virtual network address with at least one device that is registered as a member of the network.

80. The system of claim 75 wherein the virtual network manager includes a DNS server for the virtual community network.

81. The system of claim 75 wherein the virtual network manager includes a NAT device detector for devices connecting with the virtual network manager behind a NAT device.

82. The system of claim 75 wherein the virtual network manager includes at least a second virtual community definition.

83. The system of claim 75 wherein the virtual network manager includes a member authenticator.

84. The system of claim 75 wherein the virtual network manager includes a DNS server configured to provide authoritative responses for DNS queries from devices in the virtual community.

85. The system of claim 75 further comprising at least one route director configured to communicate with the one or more devices in the user set.

86. The system of claim 75 wherein each device registered in the network is configured to communicate with the virtual network manager and other devices in the user set via at least one agent.

87. The system of claim 75 wherein the user set includes at least a first device and a second device, and wherein at least one of said first device and said second device is coupled to a first private network and accesses a public network via a NAT device.

88. The system of claim 87 wherein said first device is coupled to said first private network, and said second device is coupled to a second private network and accesses the public network via a second NAT device.

89. The system of claim 75 wherein communications between the one or more devices in the user set are encrypted.

90. The system of claim 89 wherein the virtual network manager is configured to provide a shared message to the one or more devices in the user set to establish encrypted communications.

* * * * *

UNITED STATES PATENT AND TRADEMARK OFFICE
CERTIFICATE OF CORRECTION

| | | |
|---|---|---|
| PATENT NO. | : 7,949,785 B2 | Page 1 of 1 |
| APPLICATION NO. | : 10/403818 | |
| DATED | : May 24, 2011 | |
| INVENTOR(S) | : Alkhatib et al. | |

It is certified that error appears in the above-identified patent and that said Letters Patent is hereby corrected as shown below:

Title Page 3, item (56), under "Other Publications", in Column 1, Line 11, delete "Nelowrks." and insert -- Networks. --.

Title Page 3, item (56), under "Other Publications", in Column 2, Line 22, delete "Infrastucture" and insert -- Infrastructure --.

Column 40, line 15, in Claim 64, delete "the" and insert -- the communication agent --.

Signed and Sealed this
First Day of November, 2011

David J. Kappos
*Director of the United States Patent and Trademark Office*